US010839393B2

United States Patent
Chandrasekaran et al.

(10) Patent No.: US 10,839,393 B2
(45) Date of Patent: Nov. 17, 2020

(54) FACIAL PROFILE MODIFICATION FOR HANDS FREE TRANSACTIONS

(71) Applicant: GOOGLE LLC, Mountain View, CA (US)

(72) Inventors: Sashikanth Chandrasekaran, Belmont, CA (US); Denise Ho, Los Altos, CA (US); Dmitry Kalenichenko, Marina del Rey, CA (US); Varouj Chitilian, Hillsborough, CA (US); Timothy Raymond Zwiebel, Mountain View, CA (US); Michal Palczewski, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/684,903

(22) Filed: Nov. 15, 2019

(65) Prior Publication Data
US 2020/0082410 A1 Mar. 12, 2020

Related U.S. Application Data

(63) Continuation of application No. 15/447,083, filed on Mar. 1, 2017, now Pat. No. 10,482,463.
(Continued)

(51) Int. Cl.
*G06Q 20/40* (2012.01)
*G06F 21/32* (2013.01)
*G06Q 20/20* (2012.01)

(52) U.S. Cl.
CPC ....... *G06Q 20/40145* (2013.01); *G06F 21/32* (2013.01); *G06Q 20/202* (2013.01)

(58) Field of Classification Search
CPC ...... G06Q 20/20; G06Q 20/40; G06Q 20/202; G06Q 20/206; G06Q 20/327;
(Continued)

(56) References Cited

U.S. PATENT DOCUMENTS

| 5,280,527 A | 1/1994 | Gullman et al. |
| 6,185,545 B1 | 2/2001 | Resnick et al. |

(Continued)

FOREIGN PATENT DOCUMENTS

| EP | 1 246 144 A2 | 10/2002 |
| JP | 2003-099691 A | 4/2003 |

(Continued)

OTHER PUBLICATIONS

U.S. Appl. No. 14/539,997 to Chitilian et al. filed Nov. 12, 2014.
(Continued)

*Primary Examiner* — Michael R Vaughan
*Assistant Examiner* — Richard A McCoy
(74) *Attorney, Agent, or Firm* — Dority & Manning, P.A.

(57) ABSTRACT

An account management system establishes a facial template for a user based on an image. The user computing device, signed into a payment application at the merchant location, receives an identifier from a merchant beacon device to transmit to the account management system, which transmits payment tokens based on payment account data and facial templates to the merchant POS device for each user signed in at the merchant location. The merchant POS device identifies the user by comparing a captured image of the user against the received facial templates and transmits the payment token to an issuer system. At a later time, the account management system receives, from a user computing device, a subsequent user image and generates a subsequent facial template. If the difference of the subsequent facial template is less than a threshold from the existing facial template, the subsequent facial template is associated with the user account.

10 Claims, 16 Drawing Sheets

Related U.S. Application Data

(60) Provisional application No. 62/302,142, filed on Mar. 1, 2016.

(58) Field of Classification Search
CPC ............ G06Q 20/409; G06Q 20/3224; G06Q 20/4093; H04W 4/02; H04W 4/21; H04W 4/25; G06F 21/32; G06F 21/34; G06F 21/35; G06K 9/00275; G06K 9/281; G06K 9/328; G06K 9/00288; G06K 9/00228; G06K 9/00221; G06K 2009/00328

See application file for complete search history.

(56) References Cited

U.S. PATENT DOCUMENTS

| | | | |
|---|---|---|---|
| 6,230,148 B1 | 5/2001 | Pare, Jr. et al. | |
| 6,311,272 B1* | 10/2001 | Gressel | G06K 9/00885 713/186 |
| 6,601,762 B2 | 8/2003 | Piotrowski | |
| 6,766,306 B1 | 7/2004 | Matsuyama | |
| 6,783,459 B2 | 8/2004 | Cumbers | |
| 6,847,953 B2 | 1/2005 | Kuo | |
| 6,934,381 B1 | 8/2005 | Klein et al. | |
| 7,665,657 B2 | 2/2010 | Huh | |
| 7,761,381 B1 | 7/2010 | Fitch et al. | |
| 8,254,647 B1* | 8/2012 | Nechyba | G06K 9/00248 382/118 |
| 8,396,809 B1 | 3/2013 | Raff et al. | |
| 8,558,663 B2 | 10/2013 | Newman et al. | |
| 8,694,352 B1 | 4/2014 | Hawkins et al. | |
| 8,694,792 B2 | 4/2014 | Whillock | |
| 8,768,838 B1 | 7/2014 | Hoffman | |
| 8,793,509 B1 | 7/2014 | Nelson et al. | |
| 8,930,274 B1 | 1/2015 | Brickell et al. | |
| 9,229,623 B1* | 1/2016 | Penilla | H01M 10/46 |
| 9,264,850 B1 | 2/2016 | Lee | |
| 9,373,112 B1* | 6/2016 | Henderson | G06Q 20/40 |
| 9,519,901 B1 | 12/2016 | Dorogusker | |
| 9,619,803 B2 | 4/2017 | Chandrasekaran et al. | |
| 9,652,759 B2 | 5/2017 | Chitilian et al. | |
| 9,652,791 B1 | 5/2017 | Brock | |
| 9,665,858 B1 | 5/2017 | Kumar | |
| 9,747,587 B2* | 8/2017 | Diehl | G06Q 20/20 |
| 9,760,905 B2 | 9/2017 | Yoder et al. | |
| 9,770,206 B2* | 9/2017 | Ashokan | A61B 5/4872 |
| 9,805,366 B1 | 10/2017 | Wilson et al. | |
| 9,881,303 B2* | 1/2018 | Vohra | G06Q 20/40145 |
| 9,972,004 B1* | 5/2018 | Donavalli | G06Q 20/3224 |
| 10,185,958 B2 | 1/2019 | Henderson et al. | |
| 2001/0013545 A1 | 8/2001 | Hogan | |
| 2001/0034724 A1 | 10/2001 | Thieme | |
| 2001/0044744 A1 | 11/2001 | Rhoads | |
| 2002/0026575 A1 | 2/2002 | Wheeler et al. | |
| 2002/0132663 A1 | 9/2002 | Cumbers | |
| 2002/0164022 A1 | 11/2002 | Strasser et al. | |
| 2003/0028481 A1 | 2/2003 | Flitcroft et al. | |
| 2003/0149661 A1 | 8/2003 | Mitchell et al. | |
| 2004/0039692 A1 | 2/2004 | Shields et al. | |
| 2004/0117625 A1 | 6/2004 | Grawrock | |
| 2004/0236701 A1* | 11/2004 | Beenau | G06F 21/32 705/64 |
| 2005/0129286 A1 | 6/2005 | Hekimian | |
| 2005/0165667 A1* | 7/2005 | Cox | G06Q 20/10 705/35 |
| 2005/0246293 A1 | 11/2005 | Ong | |
| 2006/0056662 A1 | 3/2006 | Thieme et al. | |
| 2006/0203776 A1 | 9/2006 | Persaud et al. | |
| 2006/0222211 A1* | 10/2006 | Olivo, Jr. | G06K 9/00979 382/115 |
| 2006/0235761 A1 | 10/2006 | Johnson | |
| 2007/0084913 A1 | 4/2007 | Weston | |
| 2007/0183634 A1 | 8/2007 | Dussich et al. | |
| 2007/0203999 A1 | 8/2007 | Townsley et al. | |
| 2008/0169903 A1 | 7/2008 | Fein et al. | |
| 2009/0005987 A1* | 1/2009 | Vengroff | G06Q 30/02 701/300 |
| 2009/0018924 A1 | 1/2009 | Roberts | |
| 2009/0119170 A1* | 5/2009 | Hammad | G06Q 20/10 705/14.17 |
| 2009/0140838 A1 | 6/2009 | Newman et al. | |
| 2009/0292641 A1 | 11/2009 | Weiss | |
| 2009/0313129 A1* | 12/2009 | Rothschild | G06Q 20/40145 705/17 |
| 2009/0325606 A1* | 12/2009 | Farris | H04W 4/023 455/456.3 |
| 2009/0327133 A1 | 12/2009 | Aharoni et al. | |
| 2010/0006641 A1* | 1/2010 | Boutcher | G06Q 20/20 235/379 |
| 2010/0084462 A1 | 4/2010 | Scipioni et al. | |
| 2010/0114776 A1 | 5/2010 | Weller et al. | |
| 2010/0211966 A1* | 8/2010 | Zhang | H04N 21/4223 725/10 |
| 2011/0047045 A1 | 2/2011 | Brody et al. | |
| 2011/0161233 A1 | 6/2011 | Tieken | |
| 2011/0178883 A1 | 7/2011 | Granbery et al. | |
| 2011/0190055 A1* | 8/2011 | Leyvand | A63F 13/428 463/36 |
| 2011/0202466 A1* | 8/2011 | Carter | H04L 63/08 705/67 |
| 2011/0238476 A1 | 9/2011 | Carr et al. | |
| 2011/0257985 A1* | 10/2011 | Goldstein | G06F 16/5838 705/1.1 |
| 2011/0258122 A1 | 10/2011 | Shader et al. | |
| 2011/0264543 A1 | 10/2011 | Taveau et al. | |
| 2011/0295707 A1 | 12/2011 | Gui et al. | |
| 2011/0307403 A1* | 12/2011 | Rostampour | G06Q 50/265 705/325 |
| 2012/0030006 A1 | 2/2012 | Yoder et al. | |
| 2012/0115512 A1 | 5/2012 | Grainger et al. | |
| 2012/0166314 A1 | 6/2012 | Kimberg | |
| 2012/0213420 A1 | 8/2012 | Steiner | |
| 2012/0257797 A1 | 10/2012 | Leyvand et al. | |
| 2012/0284193 A1 | 11/2012 | Bharghavan et al. | |
| 2012/0316953 A1 | 12/2012 | Ramchandani et al. | |
| 2013/0006784 A1 | 1/2013 | Krauss et al. | |
| 2013/0006810 A1 | 1/2013 | Elias | |
| 2013/0024308 A1 | 1/2013 | Ramaswamy et al. | |
| 2013/0031006 A1 | 1/2013 | Mccullagh et al. | |
| 2013/0035979 A1* | 2/2013 | Tenbrock | G06Q 30/02 705/7.29 |
| 2013/0132274 A1 | 5/2013 | Henderson et al. | |
| 2013/0134215 A1 | 5/2013 | Ramachandran et al. | |
| 2013/0226791 A1 | 8/2013 | Springer et al. | |
| 2013/0226800 A1 | 8/2013 | Patel et al. | |
| 2013/0275247 A1 | 10/2013 | Ramaratnam et al. | |
| 2013/0282502 A1 | 10/2013 | Jooste | |
| 2013/0282582 A1 | 10/2013 | Pereira et al. | |
| 2013/0297730 A1 | 11/2013 | Zhang et al. | |
| 2013/0346201 A1 | 12/2013 | Bilange | |
| 2014/0006123 A1 | 1/2014 | Kepecs | |
| 2014/0032415 A1 | 1/2014 | Lee et al. | |
| 2014/0040051 A1 | 2/2014 | Ovick et al. | |
| 2014/0040125 A1 | 2/2014 | Kunz et al. | |
| 2014/0040135 A1 | 2/2014 | Ovick et al. | |
| 2014/0040139 A1 | 2/2014 | Brudnicki et al. | |
| 2014/0053255 A1 | 2/2014 | Lindteigen et al. | |
| 2014/0067649 A1* | 3/2014 | Kannan | G06Q 30/0261 705/38 |
| 2014/0067679 A1 | 3/2014 | O'reilly et al. | |
| 2014/0074709 A1 | 3/2014 | Green et al. | |
| 2014/0086590 A1 | 3/2014 | Ganick et al. | |
| 2014/0164254 A1 | 6/2014 | Dimmick | |
| 2014/0165187 A1* | 6/2014 | Daesung | H04L 63/0861 726/19 |
| 2014/0189808 A1 | 7/2014 | Mahaffey et al. | |
| 2014/0201080 A1 | 7/2014 | Just | |
| 2014/0222596 A1 | 8/2014 | S | |
| 2014/0227999 A1 | 8/2014 | Ferlin | |
| 2014/0237587 A1 | 8/2014 | Forbes et al. | |
| 2014/0279458 A1 | 9/2014 | Holman et al. | |
| 2014/0330659 A1 | 11/2014 | Yopp et al. | |

(56) References Cited

U.S. PATENT DOCUMENTS

| | | |
|---|---|---|
| 2014/0351072 A1 | 11/2014 | Wieler et al. |
| 2014/0351132 A1 | 11/2014 | Wieler et al. |
| 2014/0372128 A1* | 12/2014 | Sheets .................... G06Q 20/20 704/273 |
| 2015/0006271 A1 | 1/2015 | Oppenheim et al. |
| 2015/0012418 A1 | 1/2015 | Chu |
| 2015/0013003 A1 | 1/2015 | Osterlund et al. |
| 2015/0046990 A1* | 2/2015 | Oberheide ............. G06F 21/45 726/6 |
| 2015/0066671 A1* | 3/2015 | Nichols .................... G07G 3/00 705/18 |
| 2015/0073980 A1* | 3/2015 | Griffin .................. H04W 8/005 705/39 |
| 2015/0079942 A1 | 3/2015 | Kostka et al. |
| 2015/0081550 A1 | 3/2015 | Priebatsch et al. |
| 2015/0106216 A1 | 4/2015 | Kenderov |
| 2015/0120473 A1* | 4/2015 | Jung .................... G06Q 20/204 705/17 |
| 2015/0161417 A1* | 6/2015 | Kaplan ............. G06Q 30/0234 235/380 |
| 2015/0170145 A1 | 6/2015 | Patel et al. |
| 2015/0181384 A1 | 6/2015 | Mayor et al. |
| 2015/0186871 A1 | 7/2015 | Laracey |
| 2015/0261787 A1* | 9/2015 | Hu ........................ G06F 16/583 382/118 |
| 2015/0269583 A1 | 9/2015 | Taylor et al. |
| 2015/0302412 A1 | 10/2015 | Bhanoo |
| 2015/0309569 A1* | 10/2015 | Kohlhoff ............. G06F 3/04842 345/156 |
| 2015/0356563 A1* | 12/2015 | Vohra ................ G06Q 20/3224 705/44 |
| 2015/0371234 A1 | 12/2015 | Huang et al. |
| 2015/0373762 A1 | 12/2015 | Raj et al. |
| 2015/0379506 A1 | 12/2015 | Griffin |
| 2015/0379650 A1 | 12/2015 | Theobald |
| 2016/0012413 A1 | 1/2016 | Chitilian et al. |
| 2016/0012414 A1 | 1/2016 | Chitilian et al. |
| 2016/0012420 A1 | 1/2016 | Chitilian et al. |
| 2016/0012421 A1 | 1/2016 | Chitilian et al. |
| 2016/0012422 A1 | 1/2016 | Chitilian et al. |
| 2016/0012423 A1 | 1/2016 | Chitilian et al. |
| 2016/0012426 A1 | 1/2016 | Chitilian et al. |
| 2016/0012428 A1 | 1/2016 | Haldenby et al. |
| 2016/0012430 A1 | 1/2016 | Chandrasekaran et al. |
| 2016/0019547 A1 | 1/2016 | Gurnani et al. |
| 2016/0042346 A1* | 2/2016 | Pastore ................ G06Q 20/363 705/44 |
| 2016/0048846 A1 | 2/2016 | Douglas et al. |
| 2016/0063435 A1 | 3/2016 | Shah et al. |
| 2016/0063459 A1 | 3/2016 | Li et al. |
| 2016/0321633 A1 | 11/2016 | Chandrasekaran et al. |
| 2016/0321671 A1 | 11/2016 | Chandrasekaran et al. |
| 2016/0323274 A1 | 11/2016 | Chandrasekaran et al. |
| 2016/0342967 A1 | 11/2016 | Proctor et al. |
| 2016/0353274 A1 | 12/2016 | Chichierchia |
| 2016/0364701 A1 | 12/2016 | Nayfack |
| 2017/0024731 A1 | 1/2017 | Gullett et al. |
| 2017/0053276 A1 | 2/2017 | Gullett et al. |
| 2017/0091765 A1 | 3/2017 | Lloyd et al. |
| 2017/0116589 A1 | 4/2017 | Krishnaiah |
| 2017/0193480 A1 | 7/2017 | Chandrasekaran et al. |
| 2017/0221065 A1 | 8/2017 | Chitilian et al. |
| 2017/0255923 A1 | 9/2017 | Dieter et al. |
| 2017/0255941 A1 | 9/2017 | Chandrasekaran et al. |
| 2017/0255942 A1 | 9/2017 | Chandrasekaran et al. |
| 2017/0300957 A1 | 10/2017 | Yoder et al. |
| 2017/0323299 A1 | 11/2017 | Davis |
| 2017/0364901 A1 | 12/2017 | Chandrasekaran et al. |
| 2018/0032798 A1 | 2/2018 | Setchell |
| 2019/0130408 A1 | 5/2019 | Chitilian et al. |
| 2019/0266598 A1 | 8/2019 | Chitilian et al. |
| 2019/0287097 A1 | 9/2019 | Chitilian et al. |

FOREIGN PATENT DOCUMENTS

| | | |
|---|---|---|
| JP | 2006-139476 A | 6/2006 |
| JP | 2009-211488 A | 9/2009 |
| JP | 2011-014174 A | 1/2011 |
| JP | 2014-099156 A | 5/2014 |
| JP | 2014-164367 A | 9/2014 |
| JP | 2014-191416 A | 10/2014 |
| JP | 2016-024758 A | 2/2016 |
| KR | 2012-0011776 A | 2/2012 |
| KR | 101242390 81 | 3/2013 |
| KR | 10-2015-0003922 A | 1/2015 |
| KR | 10-2015-0011046 A | 1/2015 |
| WO | 02/099758 A1 | 12/2002 |
| WO | 2005/031663 A2 | 4/2005 |
| WO | 2008/101142 A1 | 8/2008 |
| WO | 2014/045713 A1 | 3/2014 |
| WO | 2014/092233 A1 | 6/2014 |
| WO | 2014/130222 A1 | 8/2014 |
| WO | 2014/182787 A2 | 11/2014 |
| WO | 2015/072191 A1 | 5/2015 |
| WO | 2016/007445 A1 | 1/2016 |
| WO | 2016/007801 A1 | 1/2016 |
| WO | 2016/007934 A1 | 1/2016 |
| WO | 2016/007445 A8 | 3/2016 |
| WO | 2016/033468 A1 | 3/2016 |
| WO | 2017/151700 A1 | 9/2017 |
| WO | 2017/151815 A1 | 9/2017 |
| WO | 2017/151825 A1 | 9/2017 |
| WO | 2017/222837 A1 | 12/2017 |
| WO | 2018/026688 A1 | 2/2018 |

OTHER PUBLICATIONS

U.S. Appl. No. 15/492,718 to Chitilian et al. filed Apr. 20, 2017.
U.S. Appl. No. 14/540,001 to Chitilian et al. filed Nov. 12, 2014.
U.S. Appl. No. 14/540,004 to Chitilian et al. filed Nov. 12, 2014.
U.S. Appl. No. 14/540,009 to Chitilian et al. filed Nov. 12, 2014.
U.S. Appl. No. 16/233,442 to Chitilian et al. filed Dec. 27, 2018.
U.S. Appl. No. 14/540,031 to Chitilian et al. filed Nov. 12, 2014.
U.S. Appl. No. 16/238,492 to Chitilian et al. filed Jan. 2, 2019.
U.S. Appl. No. 14/540,034 to Chitilian et al. filed Nov. 12, 2014.
U.S. Appl. No. 14/540,036 to Chitilian et al. filed Nov. 12, 2014.
U.S. Appl. No. 14/797,029 to Chandrasekaran et al. filed Jul. 10, 2015.
U.S. Appl. No. 15/446,734 to Dieter et al. filed Mar. 1, 2017.
U.S. Appl. No. 15/446,990 to Chandrasekaran et al. filed Mar. 1, 2017.
U.S. Appl. No. 15/447,083 to Chandrasekaran et al. filed Mar. 1, 2017.
U.S. Appl. No. 15/616,895 to Chandrasekaran et al. filed Jun. 7, 2017.
U.S. Appl. No. 15/664,640 to Setchell filed Jul. 31, 2017.
U.S. Appl. No. 16/407,133 to Chitilian et al. filed May 8, 2019.
U.S. Appl. No. 16/428,234 to Chitilian et al. filed May 31, 2019.
U.S. Appl. No. 16/672,404 to Setchell et al. filed Nov. 1, 2019.
"Paypal Beacon", https://www.paypal.com/webapps/mpp/beacon, Jul. 17, 2014, 6 pages.
Baharlou "International Preliminary Report on Patentability issued in International Application No. PCT/US2015/040067", dated Jan. 26, 2017, 7 pages.
Baharlou "International Preliminary Report on Patentability issued in International Application No. PCT/US2017/020270", dated Sep. 13, 2018, 8 pages.
Bartley "U.S. Office Action issued in copending U.S. Appl. No. 15/446,734, filed Mar. 1, 2017", dated Apr. 1, 2019, 35 pages.
Bartley "U.S. Office Action issued in copending U.S. Appl. No. 15/446,734, filed Mar. 1, 2017", dated Jul. 24, 2019, 51 pages.
Berlea "Extended European Search Report issued in European Application No. 17760676.1", dated Jul. 30, 2019, 8 pages.
Berthon "International Search Report and Written Opinion issued in International Application No. PCT/US2015/040067", dated Oct. 26, 2015, 8 pages.

(56) References Cited

OTHER PUBLICATIONS

Berthon "International Search Report and Written Opinion issued in International Application No. PCT/US2017/036883", dated Sep. 18, 2017, 13 pages.
Berthon "International Search Report and Written Opinion issued in International Application No. PCTUS2015/039836", dated Oct. 26, 2015, 10 pages.
Chang "U.S. Office Action issued in copending U.S. Appl. No. 15/664,640, filed Jul. 7, 2017", dated Feb. 5, 2019, 8 pages.
Dega "U.S. Office Action issued in copending U.S. Appl. No. 15/446,990, filed Mar. 1, 2017", dated May 2, 2019, 16 pages.
Dega "U.S. Office Action issued in copending U.S. Appl. No. 15/446,990, filed Mar. 1, 2017", dated Nov. 29, 2019, 20 pages.
Getachew "U.S. Office Action issued in copending U.S. Appl. No. 14/540,034, filed Nov. 12, 2014", dated Feb. 19, 2019, 30 pages.
Getachew "U.S. Office Action issued in copending U.S. Appl. No. 14/540,034, filed Nov. 12, 2014", dated Jun. 23, 2017, 15 pages.
Getachew "U.S. Office Action issued in copending U.S. Appl. No. 14/540,034, filed Nov. 12, 2014", dated Dec. 19, 2017, 26 Pages.
Getachew "U.S. Office Action issued in copending U.S. Appl. No. 14/540,034, filed Nov. 12, 2014", dated Jul. 25, 2018, 26 pages.
Getachew "U.S. Office Action issued in copending U.S. Appl. No. 14/540,036, filed Nov. 12, 2014", dated Aug. 3, 2018, 18 pages.
Getachew "U.S. Office Action issued in copending U.S. Appl. No. 14/540,036, filed Nov. 12, 2014", dated Dec. 19, 2017, 24 Pages.
Getachew "U.S. Office Action issued in copending U.S. Appl. No. 14/540,036, filed Nov. 12, 2014", dated Jun. 16, 2017, 16 pages.
Getachew "U.S. Office Action issued in copending U.S. Appl. No. 14/540,036, filed Nov. 12, 2014", dated Mar. 6, 2019, 23 pages.
Gottschalk "U.S. Office Action issued in copending U.S. Appl. No. 14/797,029, filed Jul. 10, 2015", dated Oct. 17, 2018, 14 pages.
Gottschalk "U.S. Office Action issued in copending U.S. Appl. No. 14/797,029, filed Jul. 10, 2015", dated Jun. 25, 2019, 16 pages.
Gottschalk "U.S. Office Action issued in copending U.S. Appl. No. 14/797,029, filed Jul. 10, 2015", dated Apr. 9, 2018, 13 Pages.
Kaizuka "Japanese Office Action issued in Japanese Application No. 2018-531520", dated Aug. 5, 2019, 04 pages of English Translation and 03 pages of Japanese Office Action.
Kaizuka "Japanese Office Action issued in Japanese Application No. 2018-536774", dated Aug. 5, 2019, 05 pages of English Translation and 04 pages of Japanese Office Action.
Lander "United Kingdom Office Action received for United Kingdom Patent Application No. 1709634.8", dated Aug. 29, 2019, 4 pages.
Lander "United Kingdom Office Action received for United Kingdom Patent Application No. 1709634.8", dated Nov. 16, 2017, 8 pages.
Matias Garraz "International Search Report and Written Opinion issued in International Application No. PCT/US2017/044603", dated Nov. 8, 2017, 12 pages.
McCoy "U.S. Office Action issued in copending U.S. Appl. No. 15/447,083, filed Jun. 22, 2018", dated Jun. 22, 2018, 17 pages.
McCoy "U.S. Office Action issued in copending U.S. Appl. No. 15/447,083, filed Mar. 1, 2017", dated Dec. 6, 2017, 14 pages.
McCoy "U.S. Office Action issued in copending U.S. Appl. No. 15/447,083, filed Mar. 1, 2017", dated Nov. 2, 2018, 18 pages.
McCoy "U.S. Office Action issued in copending U.S. Appl. No. 15/447,083, filed Mar. 1, 2017", dated Apr. 23, 2019, 16 pages.
Moon "Korean Office Action issued in Korean Application No. 10-2018-7019321", dated Sep. 9, 2019, 8 pages of English Translation and 8 pages of Korean Office Action.
Nickitas-Etienne "International Preliminary Report on Patentability issued in International Application No. PCT/US2015/039275", dated Jan. 26, 2017, 9 pages.
Nickitas-Etienne "International Preliminary Report on Patentability issued in International Application No. PCT/US2017/020078", dated Sep. 13, 2018, 9 pages.
Nickitas-Etienne "International Preliminary Report on Patentability issued in International Application No. PCT/US2017/020291", dated Sep. 13, 2018, 8 pages.
Nickitas-Etienne "International Preliminary Report on Patentability issued in International Application No. PCT/US2017/036883", dated Jan. 3, 2019, 7 pages.
Park "Korean Office Action issued in Korean Application No. 10-2018-7019869", dated May 28, 2019, 7 pages of English Translation and 7 pages of Korean Office Action.
Park "Korean Office Action issued in Korean Application No. 10-2018-7023338", dated Jul. 23, 2019, 7 pages of English Translation and 7 pages of Korean Office Action.
Peuser "International Search Report and Written Opinion issued in International Application No. PCT/US2015/039275", dated Oct. 8, 2015, 11 pages.
Rao "Paypal Debuts its Newest Hardward, Beacon, A Bluetooth LE Enabled Device for Hands-Free Check Ins 2 and Payments", TechCrunch, Sep. 9, 2013, 29 pages.
Raymaekers "European Office Action issued in European Application No. 15741455.8", dated Jan. 8, 2019, 14 pages.
Raymaekers "European Office Action issued in European Application No. 15742466.4", dated Jan. 22, 2019, 11 pages.
Raza "U.S. Office Action issued in copending U.S. Appl. No. 14/540,001, filed Nov. 12, 2014", dated May 8, 2018, 15 pages.
Raza "U.S. Office Action issued in copending U.S. Appl. No. 14/540,001, filed Nov. 12, 2014", dated Jan. 9, 2018, 17 pages.
Raza "U.S. Office Action issued in copending U.S. Appl. No. 14/540,001, filed Nov. 12, 2014", dated Aug. 4, 2017, 17 pages.
Raza "U.S. Office Action issued in copending U.S. Appl. No. 14/540,001, filed Nov. 12, 2014", dated Feb. 27, 2019, 10 pages.
Raza "U.S. Office Action issued in copending U.S. Appl. No. 14/540,004, filed Nov. 12, 2014", dated Mar. 25, 2019, 8 pages.
Raza "U.S. Office Action issued in copending U.S. Appl. No. 14/540,004, filed Nov. 12, 2014", dated Jun. 21, 2017, 17 pages.
Raza "U.S. Office Action issued in copending U.S. Appl. No. 14/540,004, filed Nov. 12, 2014", dated May 3, 2018, 15 pages.
Wittmann-Regis, Agnes, "International Preliminary Report on Patentability issued in International Application No. PCT/US2015/039836", dated Jan. 26, 2017, 8 pages.
Raza, Zehra, "U.S. Office Action issued in copending U.S. Appl. No. 14/540,004, filed Nov. 12, 2014", dated Dec. 26, 2017, 17 pages.
Raza, Zehra, "U.S. Office Action issued in copending U.S. Appl. No. 14/540,009, filed Nov. 12, 2014", dated Jan. 9, 2018, 16 pages.
Raza, Zehra, "U.S. Office Action issued in copending U.S. Appl. No. 14/540,009, filed Nov. 12, 2014", dated Sep. 7, 2017, 15 pages.
Raza, Zehra, "U.S. Office Action issued in copending U.S. Appl. No. 14/540,03, filed Nov. 12, 2014", dated Nov. 24, 2017, 19 pages.
Raza, Zehra, "U.S. Office Action issued in copending U.S. Appl. No. 14/540,031, filed Nov. 12, 2014", dated Jun. 13, 2018, 19 pages.
Raza, Zehra, "U.S. Office Action issued in copending U.S. Appl. No. 14/540,031, filed Nov. 12, 2014", dated Oct. 2, 2018, 17 pages.
Reichert, Jacques, "International Search Report and Written Opinion issued in International Application No. PCT/US2017/020291", dated May 9, 2017, 14 pages.
Shah, Bhavin D., "U.S. Office Action issued in copending U.S. Appl. No. 15/616,895, filed Jun. 7, 2017", dated Aug. 20, 2019, 27 pages.
Tanaami, Tadao, "Japanese Office Action issued in Japanese Application No. 2018-531154", dated Oct. 21, 2019, 07 pages of English Translation and 06 pages of Japanese Office Action.
Tang, Xiaofan, "International Preliminary Report on Patentability issued in International Application No. PCT/US2017/044603", dated Feb. 14, 2019, 8 pages.
Thomas, Shane, "International Search Report and Written Opinion issued in International Application No. PCT/US2017/020078", dated May 25, 2017, 10 pages.
Toscano Oliveros, Lucia, "International Search Report and Written Opinion issued in International Application No. PCT/US2017/020270", dated May 9, 2017, 13 pages.
Winter, John M., "U.S. Office Action issued in copending U.S. Appl. No. 14/539,997, filed Nov. 12, 2014", dated Jun. 17, 2015, 11 pages.
Winter, John M., "U.S. Office Action issued in copending U.S. Appl. No. 14/539,997, filed Nov. 12, 2014", dated Jun. 30, 2016, 16 pages.

(56) References Cited

OTHER PUBLICATIONS

Winter, John M., "U.S. Office Action issued in copending U.S. Appl. No. 14/539,997, filed Nov. 12, 2014", dated Dec. 31, 2015, 15 pages.
Winter, John M, "U.S. Office Action issued in co-pending U.S. Appl. No. 15/492,718, filed Apr. 20, 2017", dated Jun. 12, 2019, 11 pages.
Winter, John M., "U.S. Office Action issued in copending U.S. Appl. No. 15/492,718, filed Apr. 20, 2017", dated Nov. 27, 2018, 11 pages.

\* cited by examiner

FACIAL PROFILE MODIFICATION FOR HANDS FREE TRANSACTIONS

CROSS REFERENCE TO RELATED APPLICATIONS

This application is a continuation of and claims priority to U.S. patent application Ser. No. 15/447,083 filed Mar. 1, 2017, and entitled "Facial Profile Modification for Hands Free Transactions," which claims priority to U.S. Provisional Patent Application No. 62/302,142 filed Mar. 1, 2016, and entitled "Facial Profile Modification for Hands Free Transactions."The complete disclosure of the above-identified priority applications is hereby fully incorporated herein by reference.

TECHNICAL FIELD

The present disclosure relates to improving user security in transactions by requiring updated user biometric information associated with user payment accounts to substantially agree with previously submitted biometric information.

BACKGROUND

When consumers make purchases at a merchant location, many methods of conducting a transaction are available. Consumers may use many different cards or accounts for purchases, such as gift cards, debit cards, credit cards, stored value cards, and other cards or accounts. The user account identifiers and other data represented by the cards may be communicated to the merchant system via magnetic stripes, near field communication technologies involving user computing devices, and other suitable mechanisms.

Current applications for conducting transactions at a merchant location may provide the opportunity for the consumer to make a hands-free transaction verified via biometric information of a user, such as image or voice recognition of a user at checkout. However, current applications may not adequately prevent illegitimate users from updating biometric information of a user.

SUMMARY

Techniques herein provide computer-implemented methods to process hands-free transactions with facial recognition of a user and for enabling the user to update a facial template of the user for use in hands-free transactions. According to one aspect a computer-implemented method to update a facial template for use in processing a hands-free transaction with facial recognition of a user is proposed, the method comprising: generating, by the one or more computing devices, a first facial template comprising a computer code representation of the first facial image; associating, by the one or more computing devices, the generated first facial template with an account of the user; receiving, by one or more computing devices and from a user computing device, a (subsequent) second facial image of the user and an indication of an input of an option to modify the first facial template; generating, by the one or more computing devices, a second facial template comprising a computer code representation of the second facial image; determining, by the one or more computing devices, a difference value representing a difference between the generated second facial template and the generated first facial template by comparing the generated second facial template against the generated first facial template; and in response to determining that the difference value representing the difference between the generated second facial template and the generated first facial template is less than a threshold difference value, associating, by the one or more computing devices, the generated second facial template with the account of the user. The one or more computer devices receiving a first facial image of a user and generating a first facial template may by an account management system maintaining user accounts.

In an example, a merchant system registers with the account management system. The merchant system installs one or more merchant beacon devices and one or more (merchant) point of sale devices at a merchant system location. A user establishes an account with the account management system and downloads a payment application on a user computing device associated with the user. In an example, the user transmits an image of himself to the account management system to establish a facial template associated with the user account. In addition, the user may transmit an audio recording of himself to the account management system to establish an additional audio template associated with the user account. The user associated with the user account, at a time after initially configuring a facial template, audio template, and/or challenge and response for the user account, may wish to update one or more of the facial template, the audio template, and/or the challenge and response associated with the user account. In another example, the user computing device is stolen from the user and an illegitimate user attempts to reconfigure the facial template, audio template, and/or challenge and response for the user account so that the illegitimate user can engage in hands-free transactions using the user computing device of the user. The user (or other, illegitimate user) selects an option via the payment application to modify, e.g., change the facial template or audio template associated with the user account. The payment application activates the camera module of the user computing device and displays a request for the user to take a facial picture of himself. In another example, the payment application activates an audio module of the user computing device and displays a request for the user to record audio of himself. The payment application transmits the recorded audio or facial image to the account management system, which generates a facial template or audio template based on the captured image and/or audio from the user. The account management system compares the generated facial template or audio template against the facial template or audio template associated with the user account. If the difference (evaluated based on a difference value) between the generated facial or audio template and the corresponding template previously associated with the user account is greater than a threshold difference value, the account management system alerts the payment application that the facial template or audio template was not successfully updated. In another example, if a similarity between the generated facial or audio template and the corresponding template previously associated with the user account is less than a threshold amount, the account management system alerts the payment application that the facial template or audio template was not successfully updated. If the difference between the generated facial or audio template and the corresponding template previously associated with the user account is equal to or less than a threshold amount, the account management system associates the generated facial or audio template with the user account and alerts the payment application that the facial template or audio template was successfully updated. In another example, if a similarity between the generated facial or audio template and the corresponding template previously associated with the user account is greater than or equal to a threshold amount, the account management system associates the generated facial or audio template with the user account and alerts the payment application that the facial template or audio template was successfully updated. If successfully updated, the user may engage in hands-free transactions using the updated facial template or updated audio template.

In one example, at a time after associating the first generated facial template with the user account and before receiving the second facial image, location data corresponding to a location comprising a point of sale device is receive by the one or more computing devices (e.g. of an account managing system) and from the user computing device, Then, the first generated facial template is added, by the one or more computing devices to a log of current customers at the location and a request for the log of current customers at the location is received by the one or more computing devices and from the point of sale device at the location. Subsequently, the log of current customers comprising at least the first generated facial template is transmitted, by the one or more computing devices and to the point of sale device at the location, In one example, which may naturally be combined with the previously stated example, at a time after associating the second generated facial template with the user account, location data corresponding to a location comprising a point of sale device is received by the one or more computing devices and from the user computing device in order to add, by the one or more computing devices, the second generated facial template to a log of current customers at the location. After receiving, by the one or more computing devices and from the point of sale device at the location, a request for the log of current customers at the location; the log of current customers comprising at least the second generated facial template is transmitted, by the one or more computing devices, to the point of sale device at the location.

In certain other example aspects described herein, systems and computer program products to conduct a hands-free transaction with facial recognition of a user are provided. In particular, one aspect relates to a system to update a facial template for use in processing a hands-free transaction with facial recognition of a user, comprising a storage device; and a processor communicatively coupled to the storage device, wherein the processor executes application code instructions that are stored in the storage device to cause the system to: receive a first facial image of a user; generate a first facial template comprising a computer code representation of the first facial image; associate the generated first facial template with an account of the user; receive, from a user computing device, a second facial image of the user and an indication of an input of an option to modify the first facial template; generate, a second facial template comprising a computer code representation of the second facial image; determine, a difference value representing a difference between the generated second facial template and the generated first facial template by comparing the generated second facial template against the generated first facial template; and in response to determining that the difference value representing the difference between the generated second facial template and the generated first facial template is less than a threshold difference value, associate the generated second facial template with the account of the user. The system may comprise an account management system maintaining user accounts.

These and other aspects, objects, features, and advantages of the examples will become apparent to those having ordinary skill in the art upon consideration of the following detailed description of illustrated examples.

DETAILED DESCRIPTION OF EXAMPLES

Overview

Figure 1:
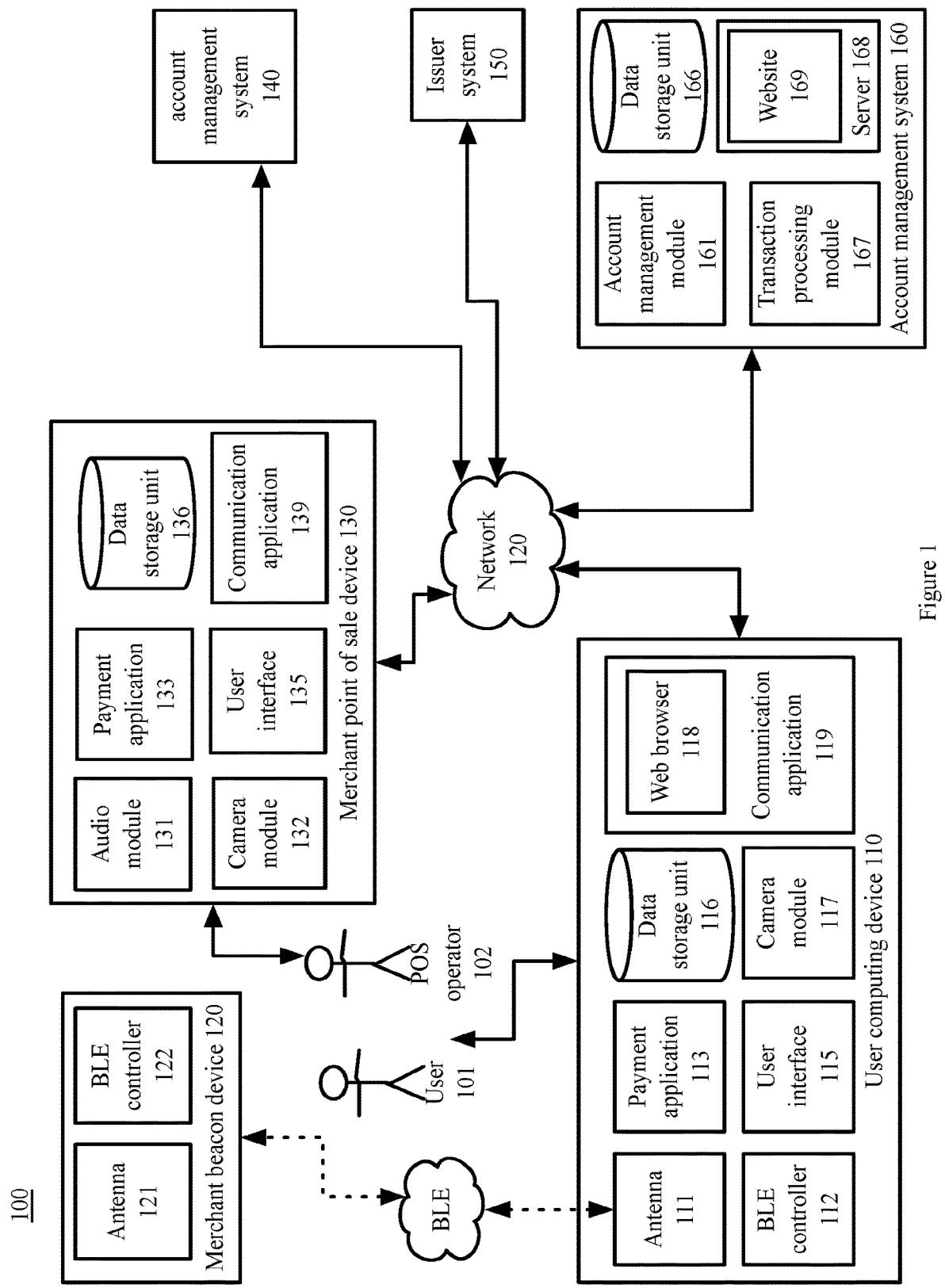
FIG. 1 is a block diagram depicting a system for processing hands-free transactions with facial recognition of a user and for enabling the user to update a facial template of the user for use in hands-free transactions, in accordance with certain examples.

The examples described herein provide computer-implemented techniques for processing hands-free transactions with facial recognition of a user and for enabling the user to update a facial template of the user for use in hands-free transactions.

In an example, a merchant system registers with an account management system. The merchant system installs one or more merchant beacon devices and one or more merchant point of sale devices at a merchant system location. A user establishes an account with the account management system and downloads a payment application on a user computing device associated with the user. In an example, the user transmits an image of himself and/or an audio recording of himself to the account management system to establish a facial template and/or audio template associated with the user account. The user enters a merchant system location and signs into the payment application via the user computing device. The user computing device receives a merchant beacon device identifier broadcasted at the merchant location from the merchant beacon device and transmits the merchant beacon device identifier to the account management system. The account management system transmits facial templates, audio templates, and/or challenges and responses to the merchant point of sale device associated with users whose user computing devices are in network range of the merchant beacon device and who are signed in to the payment application. Additionally, the account management system generates a payment token for each user whose user computing device is in network range of the merchant beacon device and who is signed in to the payment application. An example payment token comprises a series of alphanumeric and/or symbolic characters. The example payment token may be associated with a payment account of the user and be recognizable by an issuer system associated with the payment account of the user. For example, the account management system generates the payment token and communicates the payment token to an issuer system associated with a payment account of the user along with the user payment account information. In this example, if the issuer system, at a later time, receives the payment token from a point of sale device in a payment transaction, the issuer system is able to extract the user payment account information associated with the payment token.

A merchant camera device associated with the merchant point of sale device captures a facial image of the user and the merchant point of sale device identifies the user based on comparing the captured facial image against the received facial templates. Alternatively, the user submits an audio recording to the merchant point of sale device, which identifies the user based on comparing the received audio recording against audio templates for users. In yet another embodiment, the merchant point of sale device operator identifies the user based on a user's response to a challenge. After identifying the user, the merchant point of sale device processes a transaction using the payment token associated with the user received from the account management system. The merchant point of sale device generates a transaction authorization request comprising the payment token and transaction details and transmits the transaction authorization request to an issuer system associated with the user account selected for use in the transaction. The issuer system identifies the user payment account based on the received payment token and processes the transaction using the transaction details and the user payment account information. The merchant point of sale device receives an approval of the transaction authorization request and transmits a receipt to the merchant point of sale device.

The user associated with the user account, at a time after initially configuring a facial template, audio template, and/or challenge and response for the user account, may wish to update one or more of the facial template, the audio template, and/or the challenge and response associated with the user account. In another example, the user computing device is stolen from the user and an illegitimate user attempts to reconfigure the facial template, audio template, and/or challenge and response for the user account so that the illegitimate user can engage in hands-free transactions using the user computing device of the user. The user (or other, illegitimate user) selects an option via the payment application to change the facial template or audio template associated with the user account. The payment application activates the camera module of the user computing device and displays a request for the user to take a facial picture of himself. In another example, the payment application activates an audio module of the user computing device and displays a request for the user to record audio of himself. The payment application transmits the recorded audio or facial image to the account management system, which generates a facial template or audio template based on the captured image and/or audio from the user. The account management system compares the generated facial template or audio template against the facial template or audio template associated with the user account. If the difference between the generated facial or audio template and the corresponding template previously associated with the user account is greater than a threshold amount, the account management system alerts the payment application that the facial template or audio template was not successfully updated. If the difference between the generated facial or audio template and the corresponding template previously associated with the user account is equal to or less than a threshold amount, the account management system associates the generated facial or audio template with the user account and alerts the payment application that the facial template or audio template was successfully updated. If successfully updated, the user may engage in hands-free transactions using the updated facial template or updated audio template.

In an example, a merchant system registers with an account management system. A merchant system operator installs a payment application on a merchant point of sale device. In another example, the merchant system operator installs the payment application on a plurality of merchant point of sale devices at a merchant system location. A merchant beacon device receives a beacon identifier code from an account management system. For example, the merchant system operator installs one or more merchant beacon devices at the merchant system location. The merchant beacon device broadcasts the merchant beacon identifier code via wireless communication at the merchant system location. The merchant system operator installs a merchant camera device at the merchant system location to correspond to a corresponding merchant point of sale device. In another example, a plurality of merchant camera devices are installed at the merchant system location, each merchant camera device corresponding to a particular merchant point of sale device. In yet another example, a particular merchant camera device may correspond to two or more particular merchant point of sale devices.

In an example, the user registers with an account management system. For example, the user accesses an account management system website via a user computing device associated with the user. The user registers with the account management system and downloads a payment application onto the user computing device. In an example, the account management system establishes a facial template associated with the user account. For example, the payment application displays a request for the user to capture a facial image via the user computing device. The user selects an option to capture a facial image. The payment application activates a camera module on the user computing device and the users captures a facial image of himself. The account management system receives the facial image. The account management system creates a facial template associated with the user account based on the received facial image. The account management system deletes the received facial image. In another example, the account management system establishes an audio template associated with the user account. For example, the payment application requests and receives user audio via the user computing device. The payment application transmits the received user audio to the account management system and the account management system creates an audio template associated with the user account based on the received audio of the voice of the user. The account management system deletes the received audio of the voice of the user. In yet another example, the account management system establishes a challenge and response associated with the user account. For example, the payment application on the user computing device displays a challenge, such as "user initials," and requests a response from the user. In this example, user John Doe may enter "J. D." as the response to the challenge. In this example, the payment application transmits the entered response to the account management system, which associates the response with the challenge in the user account.

The user signs in to the payment application on the user computing device. The user carries the user computing device within a threshold distance of a merchant beacon device at the merchant system location. The user computing device receives a merchant beacon identifier broadcast by the merchant beacon device and transmits the received merchant beacon identifier and a user account identifier to the account management system. The account management system receives the merchant beacon identifier and the user account identifier. The account management system extracts a facial template associated with the user account identifier and identifies a merchant point of sale device associated with the merchant beacon device identifier. In another example, the account management system extracts an audio template associated with the user account identifier and/or a challenge and response associated with the user account identifier in addition to or instead of extracting the a facial template associated with the user account identifier.

The account management system transmits a facial template of the identified user to the merchant point of sale device associated with the merchant beacon device identifier. For example, a facial template associated with the identified user's account is transmitted to the merchant point of sale device. The merchant point of sale device receives the facial template of the user, audio template of the user, and/or challenge and response associated with the user.

Additionally, the account management system generates a payment token for each user whose user computing device is in network range of the merchant beacon device and who is signed in to the payment application. An example payment token comprises a series of alphanumeric and/or symbolic characters. The example payment token may be associated with a payment account of the user and be recognizable by an issuer system associated with the payment account of the user. For example, the account management system generates the payment token and communicates the payment token to an issuer system associated with a payment account of the user along with the user payment account information. In this example, if the issuer system, at a later time, receives the payment token from a point of sale device in a payment transaction, the issuer system is able to extract the user payment account information associated with the payment token.

The merchant point of sale device associates the payment token, the facial template of the user, the audio template of the user, and the challenge and response of the user in a current customer log. The merchant point of sale device periodically updates the current customer log based on updates received from the account management system. The merchant point of sale device thus updates a log of current customers at the location. For example, the account management system transmits a subsequent facial template, audio template, challenge and response, and payment token for a subsequent user that, carrying a user computing device via which the user is signed in to the payment application, enters a threshold distance of a merchant beacon device required to establish a wireless network connection. In this example, the account management system receives the merchant beacon device identifier transmitted by the user computing device, generates a payment token, and transmits a facial template of the subsequent user, audio template of the subsequent user, challenge and response of the subsequent user, and the generated payment token to the merchant point of sale device. In another example, in response to detecting that the user computing device associated with a particular user in the current customer log is no longer maintaining a network connection with the merchant beacon device, is no longer retransmitting the merchant beacon device identifier to the account management system, or is no longer signed in to the payment application, the account management system transmits a notice that a user has left a merchant location to the merchant point of sale device. In this example, the merchant point of sale device deletes the indicated user from the current customer log. For example, deleting the indicated user comprises deleting the user account identifier, facial template, audio template, challenge and response, payment token, and/or any other data associated with the particular user on the merchant point of sale device.

The user approaches the merchant point of sale device. The merchant point of sale device operator totals items of the user for purchase. The merchant point of sale device operator asks the user to select a payment option. The user directs the merchant point of sale device operator to initiate a transaction via the payment application. For example, as previously discussed, the payment application is installed on both the merchant point of sale device and on the user computing device. The merchant point of sale device operator selects an option on the merchant point of sale device to initiate a transaction using the payment application.

The merchant camera device, communicatively coupled to the merchant point of sale device, captures video of the user. For example, the user is positioned in front of the point of sale device and the merchant camera device is positioned to be able to capture a video of the user's face. In an example, the merchant camera device starts capturing video of the user only when the merchant point of sale device receives an input from an operator of the merchant point of sale device to identify the user. In another example, the merchant camera device starts capturing video when the associated merchant point of sale device receives an indication from the account management system that a user computing device associated with the user has established a network connection with the merchant beacon device and/or retransmitted the merchant beacon device identifier to the account management system. In this example, the merchant camera device does not capture video when there are no users with associated user computing devices within network range of the merchant beacon device. The merchant camera device extracts a facial image of the user from the captured video and generates a facial template from the captured facial image. The merchant camera device deletes the captured video and extracted facial image and transmits the facial template to the merchant point of sale device. In another example, the merchant camera device transmits the facial image of the user to the merchant point of sale device and the merchant point of sale device generates the facial template from the facial image.

The merchant point of sale device retrieves facial templates from the current customer log. For example, the current customer log comprises a list of users and associated facial templates for users associated with user computing devices that have currently established a network connection with the merchant beacon device at the merchant system location and/or have retransmitted the merchant beacon device identifier to the account management system. In an example, the current customer log comprises volatile or transient memory. For example, the current customer log is not saved and user information is added or deleted from the current customer log as user computing devices associated with respective users enter or leave a network range of the merchant beacon device. The merchant point of sale device compares the generated facial template from the extracted facial image to facial templates from the current customer log. The merchant point of sale device is able to identify the user if there is a match between a facial template from the current customer log and the generated facial template. The merchant point of sale device is unable to identify the user if there is no match between a facial template from the current customer log and the generated facial template. If the merchant point of sale device is able to identify the user, the merchant point of sale device notifies the account management system of the identity of the user and the account management system processes a transaction between the user and the merchant system. In an example, if the merchant point of sale device is able to identify the user but unable to notify the account management system of the identity of the user, the merchant point of sale device processes a transaction using the received payment token associated with user account of the identified user.

In an example, if the user cannot be identified based on facial recognition, the merchant point of sale device identifies the user based on audio recognition. In another example, the account management system does not identify users based on audio recognition. In an example, if the payment processing identifies users based on audio recognition, the account management system retrieves audio templates corresponding to users from the current customer log. The merchant point of sale device displays a request to record an audio of the user via a user interface of the merchant point of sale device. The merchant point of sale device records a voice input of the user and compares the received voice input against the retrieved audio templates corresponding to users from the current customer log. The merchant point of sale device is able to identify the user if there is a match between an audio template from the current customer log and the received voice input of the user. The merchant point of sale device is unable to identify the user if there is no match between an audio template from the current customer log and the received voice input of the user. If the merchant point of sale device is able to identify the user, the merchant point of sale device notifies the account management system of the identity of the user and the account management system processes a transaction between the user and the merchant system. In an example, if the merchant point of sale device is able to identify the user but unable to notify the account management system of the identity of the user, the merchant point of sale device processes a transaction using the received payment token associated with user account of the identified user.

If the merchant point of sale device is unable to identify the user based on facial and/or voice recognition, the merchant point of sale device operator is notified, via a display on the merchant point of sale device, to issue a challenge to the user. The user provides a challenge response and the merchant point of sale operator inputs the response into the merchant point of sale device. The merchant point of sale device displays potential users from the current customer log based on the challenge response. For example, the merchant point of sale device accesses the current customer log comprising a list or table that associates challenges with corresponding responses, user account identifiers, and payment tokens. In this example, the merchant point of sale device identifies the user by correlating the challenge and the response to identify one or more users in the current customer log. In this example, the merchant point of sale device displays the one or more identified users to the merchant point of sale device operator. The merchant point of sale device operator selects a user. In an example, the merchant point of sale device operator may compare a visual image or name of the user displayed on the user computing device to the visual appearance of the current customer at the merchant point of sale device and/or documentation presented by the user to the merchant point of sale operator. In an example, the merchant point of sale device transmits the identity of the user identified by the merchant point of sale operator. If the merchant point of sale device operator is able to identify the user via the challenge and response, the merchant point of sale device notifies the account management system of the identity of the user and the account management system processes a transaction between the user and the merchant system. If the merchant point of sale device operator is unable to identify the user via the challenge and response, the merchant point of sale device operator cancels the transaction by actuating one or more objects on the user interface of the merchant point of sale device. In an example, if the merchant point of sale device is able to identify the user but unable to notify the account management system of the identity of the user, the merchant point of sale device processes a transaction using the received payment token associated with user account of the identified user.

The merchant point of sale device operator confirms the transaction with permission of the user. In an example, the merchant point of sale device generates a transaction authorization request based on transaction details and the received payment token associated with the user retrieved from the current customer log. For example, transaction details may comprise a total amount of the transaction, a selected user account for use in the transaction, an account of the merchant for use in the transaction, and other useful or relevant information. The merchant point of sale device transmits a transaction authorization request to an issuer system. For example, the issuer system is associated with a user payment account selected for use by the user in all hands free transactions involving the payment application. The issuer system approves or denies the transaction authorization request and transmits a transaction authorization approval or denial of transaction authorization request to the merchant point of sale device. The merchant point of sale device transmits a transaction receipt to the user computing device and/or prints or displays a receipt for the user at the merchant point of sale device indicating a status of the transaction. For example, the merchant point of sale device displays an indication that the transaction was successfully processed or that the transaction was denied.

In another example, the merchant point of sale device transmits an indication of an identity of the user identified via facial, audio, and/or challenge and response to the account management system along with the transaction details. In this example, the account management system processes the transaction with the issuer system. For example, the account management system generates a transaction authorization request comprising the payment token, where the transaction authorization request is based on user account information and the transaction details. In an example, the merchant point of sale device transmits the transaction authorization request to the issuer system. In this example, the issuer system receives the transaction authorization request, approves or denies the transaction authorization request, and transmits either a denial of transaction authorization request or an approval of the transaction authorization request to the account management system. For example, the issuer system identifies the user payment account associated with the payment token. In an example, the transaction authorization request comprises a total transaction amount and the issuer system determines whether the transaction would result in the user exceeding the user's credit limit associated with the user payment account. The issuer system may base a decision to approve a transaction authorization request based on considerations other than the total transaction amount or the user's credit limit on the payment account.

In an example, the account management system transmits notification of an approved or denied transaction, based on the information received from the issuer system, to the merchant point of sale device and/or to the user computing device. In this example, the merchant point of sale device and/or the user computing device display or otherwise indicate to the user a status of the transaction. For example, the user computing device receives, from the account management system, and displays a text message indicating to the user that the transaction was denied.

In an example, the user associated with the user account, at a time after initially configuring a facial template, audio template, and/or challenge and response for the user account, may wish to update one or more of the facial template, the audio template, and/or the challenge and response associated with the user account. In another example, the user computing device is stolen from the user and an illegitimate user attempts to reconfigure the facial template, audio template, and/or challenge and response for the user account so that the illegitimate user can engage in hands-free transactions using the user computing device of the user. For example, the payment application may not be configured with a password and the illegitimate user may be able to access certain configurations of the payment application, such as an option to update the facial template and/or the audio template associated with the user account.

In an example, the user selects an option via the payment application to change the facial template or audio template associated with the user account. For example, the payment application displays a request for the user to capture a facial image via the user computing device. The user selects an option to capture a facial image. The payment application activates a camera module on the user computing device and the users captures a facial image of himself. The account management system receives the facial image. The account management system creates a facial template associated with the user account based on the received facial image. The account management system deletes the received facial image. In another example, the account management system establishes an audio template associated with the user account. For example, the payment application requests and receives user audio via the user computing device. The payment application transmits the received user audio to the account management system and the account management system creates an audio template associated with the user account based on the received audio of the voice of the user. The account management system deletes the received audio of the voice of the user. The account management system compares the generated facial template or audio template against the facial template or audio template currently associated with the user account. If the difference between the generated facial or audio template and the corresponding template currently associated with the user account is greater than a threshold amount, the account management system alerts the payment application that the facial template or audio template was not successfully updated. If the difference between the generated facial or audio template and the corresponding template currently associated with the user account is equal to or less than a threshold amount, the account management system associates the generated facial or audio template with the user account and alerts the payment application that the facial template or audio template was successfully updated. If successfully updated, the user may engage in hands-free transactions using the updated facial template or updated audio template.

In another example, the payment application first sends a low resolution facial image or audio recording to the account management system, which compares the low resolution facial image or low resolution audio recording against the facial template or audio template associated with the account of the user. If the difference between the received low resolution image or low resolution audio and the corresponding template previously associated with the user account is greater than a threshold amount, the account management system alerts the payment application that the facial template or audio template was not successfully updated. If the difference between the received low resolution image or low resolution audio and the corresponding template previously associated with the user account is less than or equal to a threshold amount, the account management system transmits a request for a higher resolution image or audio recording of the user, and the payment application sends a high resolution facial image or higher resolution audio recording to the account management system, which generates a facial template or audio template and compares the generated template against the template associated with the account of the user. If the difference between the generated facial or audio template and the corresponding template previously associated with the user account is equal to or less than a threshold amount, the account management system associates the generated facial or audio template with the user account and alerts the payment application that the facial template or audio template was successfully updated.

If successfully updated, the user may engage in hands-free transactions using the updated facial template or updated audio template.

In other examples, in response to determining that the difference between the generated facial or audio template and the corresponding template currently associated with the user account is greater than a threshold amount or that a similarity between the generated facial or audio template and the corresponding template previously associated with the user account is less than a threshold amount, the account management system transmits, via the network, an alert to the payment application that the facial template or audio template was not successfully updated and requests a response by the user to a challenge. In this example, the payment application displays, via the user computing device, the challenge to the user and the user inputs the response. In this example, the payment application transmits, to the account management system, the response. The account management system verifies the response to the challenge. For example, the account management system extracts the response associated with the challenge associated with the user account and determines whether the response provided by the user via the user computing device matches, exactly or substantially, the response associated with the user account. If the response provided by the user matches the response associated with the user account, the account management system associates the generated user facial template or audio template with the user account. If the response provided by the user does not match the response associated with the user account, the account management system transmits an alert to the payment application notifying the user that the facial template or audio template was not successfully updated.

By using and relying on the methods and systems described herein, the account management system, the merchant beacon device, the user computing device, and the merchant point of sale device enable the user to conduct a transaction with the merchant system without the user having to interact with the user computing device or produce identity documents or physical payment cards, as required in some current technology. As such, the systems and methods described herein may reduce the inputs required by the user via the user computing device and the inputs required by the merchant point of sale device operator to identify the user. Further, by using and relying on the methods and systems described herein, the account management system and the user computing device may increase the security of hands-free transactions by insuring that user biometric account data, such as user images and audio, cannot easily be changed by illegitimate users attempting to use the user computing device of the user in a hands free transaction.

Example System Architecture

Turning now to the drawings, in which like numerals indicate like (but not necessarily identical) elements throughout the figures, examples are described in detail.

FIG. 1 is a block diagram depicting a system 100 for conducting a hands-free transaction with facial recognition of a user 101, in accordance with certain examples. As depicted in FIG. 1, the system 100 includes network computing devices 110, 130, 140, 150, and 160 that are configured to communicate with one another via one or more networks 120. In some embodiments, a user associated with a device must install an application and/or make a feature selection to obtain the benefits of the techniques described herein.

In examples, the network 120 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, Bluetooth low energy, NFC, or any combination thereof or any other appropriate architecture or system that facilitates the communication of signals, data, and/or messages. Throughout the discussion of examples, it should be understood that the terms "data" and "information" are used interchangeably herein to refer to text, images, audio, video, or any other form of information that can exist in a computer-based environment.

Each network computing device 110, 130, 140, 150, and 160 includes a device having a communication module capable of transmitting and receiving data over the network 120. For example, each network computing device 110, 130, 140, 150, and 160 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example depicted in FIG. 1, the network computing devices 110, 130, 140, 150, and 160 are operated by users 101, merchant beacon device 120 operators, merchant point of sale ("POS") device 130 operators, payment processing system 140 operators, issuer system 150 operators, and account management system 160, respectively.

An example user computing device 110 comprises an antenna 111, a Bluetooth Low Energy ("BLE") controller 112, a payment application 113, a user interface 115, a data storage unit 116, a camera module 117, a web browser 118, and a communication application 119.

In an example, the antenna 111 is a means of communication between the user computing device 110 and a merchant beacon device 120. In an example, a BLE controller 112 outputs through the antenna 111 a radio signal, or listens for radio signals from the merchant beacon device 120. In another example a Bluetooth controller, Wi-Fi controller, or a near field communication ("NFC") controller is used. In an example, the BLE controller 112 outputs through the antenna 111 a radio signal, or listens for radio signals from the merchant beacon device 120.

In an example, the BLE controller 112 is capable of sending and receiving data, performing authentication and ciphering functions, and directing how the user computing device 110 will listen for transmissions from the merchant beacon device 120 or configuring the user computing device 110 into various power-save modes according to BLE-specified procedures. In another example, the user computing device 110 comprises a Bluetooth controller, Wi-Fi controller or an NFC controller capable of performing similar functions. An example BLE controller 112 communicates with the payment application 113 and is capable of sending and receiving data over a wireless, BLE communication channel. In another example, a Bluetooth controller 112, Wi-Fi controller 112, or NFC controller 112 performs similar functions as the BLE controller 112 using Bluetooth, Wi-Fi, or NFC protocols. In an example, the BLE controller 112 activates the antenna 111 to create a wireless communication channel between the user computing device 110 and the merchant beacon device 120. The user computing device 110 communicates with the merchant beacon device 120 via the antenna 111. In an example, when the user computing device 110 has been activated, the BLE controller 112 polls through the antenna 111 a radio signal, or listens for radio signals from the merchant beacon device 120.

In an example, the payment application 113 is a program, function, routine, applet, or similar entity that exists on and performs its operations on the user computing device 110. In certain examples, the user 101 must install the payment application 113 and/or make a feature selection on the user computing device 110 to obtain the benefits of the techniques described herein. In an example, the user 101 may access payment application 113 on the user computing device 110 via the user interface 115. In an example, the payment application 113 may be associated with the account management system 160. In another example, the payment application 113 may be associated with a merchant system associated with the merchant beacon device 120 and/or the merchant point of sale device 130.

In an example, the user interface 115 enables the user 101 to interact with the payment application 113 and/or web browser 118. For example, the user interface 115 may be a touch screen, a voice-based interface, or any other interface that allows the user 101 to provide input and receive output from an application or module on the user computing device 110. In an example, the user 101 interacts via the user interface 115 with the payment application 113 and/or web browser 118 to configure user 101 accounts with the account management system 160. In another example, the user 101 interacts via the user interface 115 with the payment application 113 and/or the web browser 118 to enable hands-free payments, if needed.

In an example, the data storage unit 116 comprises a local or remote data storage structure accessible to the user computing device 110 suitable for storing information. In an example, the data storage unit 116 stores encrypted information, such as HTML5 local storage.

In an example, the camera module 117 may be any module or function of the user computing device 110 that captures a digital image. The camera module 117 may be resident on the user computing device 110 or in any manner logically connected to the user computing device 110. For example, the camera module 117 may be connected to the user computing device 110 via the network 120. The camera module 117 may be capable of obtaining individual images or a video scan. Any other suitable image capturing device may be represented by the camera module 117.

In an example, the user 101 can use a communication application 119, such as a web browser 118 application or a stand-alone application, to view, download, upload, or otherwise access documents or web pages via a distributed network 120.

In an example, the web browser 118 can enable the user 101 to interact with web pages using the user computing device 110. In an example, the user 101 may access the user's 101 account maintained by the account management system 160 via the web browser 118. In another example, the user 101 may access a merchant system website or an account management system website 169 via the web browser 118. In certain examples described herein, one or more functions performed by the payment application 113 may also be performed by a web browser 118 application associated with the account management system 160.

In an example, the communication application 119 can interact with web servers or other computing devices connected to the network 120, including a web server of a merchant system and a web server 168 of the account management system 160.

In certain examples, one or more functions herein described as performed by the payment application 113 may also be performed by a web browser 118 application, for example, a web browser 118 application associated with a merchant system website or associated with the account management system 160. In certain examples, one or more functions herein described as performed by the payment application 113 may also be performed by the user computing device 110 operating system. In certain examples, one or more functions herein described as performed via the web browser 118 may also be performed via the payment application 113.

An example merchant beacon device 120 comprises an antenna 121 and a Bluetooth Low Energy ("BLE") controller 122. In an example, a merchant system location comprises one or more merchant beacon devices 120 installed at the merchant system location. In an example, each installed merchant beacon device 120 is associated by an account management system 160 with a particular merchant point of sale device 130 installed at the merchant location. For example, the account management system 160 may comprise a database that correlates merchant beacon device 120 identifiers with merchant point of sale device 130 identifiers for associated merchant point of sale devices 130. For example, a merchant point of sale device 130 identifier may comprise hardware identifier specific to the device such as a serial number or a media access control ("MAC") identifier. In another example, a merchant beacon device 120 identifier may comprise a hardware identifier specific to the beacon device or an identifier generated by the account management system 160 and stored in the merchant beacon device 120. An example merchant beacon device 120 is programmed to broadcast, emit, or otherwise transmit a particular merchant beacon device 120 identifier over a local wireless network, for example, a BLE network, to any user computing devices 110 within a threshold distance required to maintain the wireless network 120. For example, the wireless network may comprise a BLE network 120, a Wi-Fi network 120, a Bluetooth network 120, an NFC network 120, or any other appropriate wireless network 120.

In an example, the antenna 121 is a means of communication between the user computing device 110 and a merchant beacon device 120. In an example, a BLE controller 122 outputs through the antenna 121 a radio signal, or listens for radio signals from the user computing device 110. In another example a Bluetooth controller, Wi-Fi controller, or a near field communication ("NFC") controller is used. In an example, the BLE controller 122 outputs through the antenna 121 a radio signal, or listens for radio signals from the user computing device 110.

In an example, the BLE controller 122 is capable of sending and receiving data, performing authentication and ciphering functions, and directing how merchant beacon device 120 will listen for transmissions from the user computing device 110 or configuring the merchant beacon device 120 into various power-save modes according to BLE-specified procedures. In another example, the merchant beacon device 120 comprises a Bluetooth controller, Wi-Fi controller or an NFC controller capable of performing similar functions. An example BLE controller 122 communicates with the payment application 113 and is capable of sending and receiving data over a wireless, BLE communication channel. In another example, a Bluetooth controller 122, a Wi-Fi controller 122, or an NFC controller 122 performs similar functions as the Wi-Fi controller 122 using Bluetooth, Wi-Fi, or NFC protocols. In an example, the BLE controller 122 activates the antenna 121 to create a wireless communication channel between the user computing device 110 and the merchant beacon device 120. The merchant beacon device 120 communicates with the user computing device 110 via the antenna 121. In an example, when the merchant beacon device 120 has been activated, the BLE controller 122 polls through the antenna 121 a radio signal, or listens for radio signals from the user computing device 110.

An example merchant point of sale device 130 comprises an audio module 131, a camera module 132, a payment application 133, a user interface 135, a data storage unit 136, and a communication application 139.

In an example, the audio module 131 may be any module or function of the merchant POS device 130 that captures an audio input of an external environment of the merchant POS device 130. The audio module 131 may be resident on the merchant POS device 130 or in any manner logically connected to the merchant POS device 130. For example, the audio module 131 may be connected to the merchant POS device 130 via the network 120. The audio module 131 may be capable of obtaining an audio recording. Any suitable audio recording device may be represented by the audio module 131.

In an example, the camera module 132 may be any module or function of the merchant POS device 130 that captures an image or video input of an external environment of the merchant POS device 130. The camera module may be resident on the merchant POS device 130 or in any manner logically connected to the merchant POS device 130. For example, the audio module 131 may be connected to the merchant POS device 130 via the network 120. The camera module 132 may be capable of capturing one or more images or recording a video recording. Any suitable image capturing and/or video recording device may be represented by the camera module 132.

In an example, the payment application 133 is a program, function, routine, applet, or similar entity that exists on and performs its operations on the merchant point of sale device 130. In certain examples, the merchant point of sale ("POS") device operator 102 or other merchant system operator must install the payment application 133 and/or make a feature selection on the merchant point of sale device 130 to obtain the benefits of the techniques described herein. In an example, the merchant POS device operator 102 may access the payment application 133 on the merchant POS device 130 via the user interface 135 of the merchant point of sale device 130. In an example, the payment application 133 may be associated with the account management system 160. In another example, the payment application 133 may be associated with a merchant system associated with the merchant beacon device 120 and the merchant camera device 140.

In an example, the user interface 135 enables the merchant POS device operator 102 to interact with the merchant POS device 130. For example, the user interface 135 may be a touch screen, a voice-based interface, or any other interface that allows the merchant POS device operator 102 to provide input and receive output from an application or module on the merchant POS device 130. In an example, the merchant POS device operator 102 interacts via the user interface 135 with the payment application 133.

In an example, the data storage unit 136 comprises a local or remote data storage structure accessible to the merchant POS device 130 suitable for storing information. In an example, the data storage unit 136 stores encrypted information, such as HTML5 local storage.

In an example, the communication application 139, such as a web browser application or a stand-alone application, enables an operator of the merchant POS device 130 to view, download, upload, or otherwise access documents or web pages via a distributed network 120. For example, the communication application 139 may enable communication over the network 120 with the account management system 160, a payment processing system 140, and/or an issuer system 150.

An example payment processing system 140 communicates with the account management system 160 and the merchant point of sale device 130. In an example, when the account management system 160 processes a payment transaction, the account management system 160 transmits user 101 payment account data to the payment processing system 140, which communicates a transaction authorization request an issuer system 150 associated with the payment account data on behalf of the merchant system. In this example, the payment processing system 140 receives an approval or a denial of the payment authorization request from the issuer system 140. In this example, the payment processing system 140 communicates a notification to the account management system 160 and/or the merchant point of sale device 130 of an approved or denied transaction. In this example, the account management system 160 and/or the merchant point of sale device 130 that receives the notification of an approved or denied transaction may transmit receipt data to the user computing device 110.

An example issuer system 150 approves or denies a payment authorization request received from the merchant point of sale device 130. In an example, the issuer system 150 communicates with the merchant point of sale device 130 over the network 120. In an example, the issuer system 150 communicates with an acquirer system to approve a credit authorization for the user 101 and to make payment to the merchant system. For example, the acquirer system is a third party payment processing system 140. In other examples, the issuer system 150 receives the payment authorization request from the payment processing system 140 or the account management system 160 via the network 120.

An example account management system 160 comprises an account management module 161, a facial recognition module 163, an audio recognition module 165, a data storage unit 166, a transaction processing module 167, a server 168, and a website 169.

In an example, the account management module 161 manages one or more user 101 accounts. In an example, a user 101 account may comprise a digital wallet account, an email account, a social networking account, or any other appropriate account associated with the account management system 160. In an example, the account management system 161 communicates with a payment application 113 operating on a user computing device 110 associated with a user 101 having a user 101 account with the account management system 160. In an example, the user 101 enters payment account information into the user 101 account via the payment application 113 and the account management module 161 receives the payment account information over the network 120 and associates the received payment account information with the user 101 account.

In an example, the data storage unit 166 comprises a local or remote data storage structure accessible to the account management system 160 suitable for storing information. In an example, the data storage unit 166 stores encrypted information, such as HTML5 local storage.

In certain examples, the transaction processing module 167 receives transaction details from a merchant POS device 130 and a request to initiate a transaction. Example transaction details comprise merchant system account information, a total amount of the transaction, and a user 101 selection of a user 101 payment account associated with the user's 101 account with the account management system 160. For example, the user's 101 account is a digital wallet account comprising one or more payment account information corresponding to one or more respective payment accounts of the user 101. In an example, the transaction processing module 167 extracts payment account information from the user 101 account corresponding to the user 101 selection of the user 101 payment account received in the transaction details from the merchant POS device 130. In an example, the transaction processing module 167 transmits a payment authorization request to an issuer system 150 or other appropriate financial institution associated with the payment account selected by the user 101 for use in the transaction. An example payment authorization request may comprise merchant system payment account information, user 101 payment account information, and a total amount of the transaction. In an example, after the issuer system 150 processes the payment authorization request, the transaction processing module 167 receives an approval or denial of the payment authorization request from the issuer system 150 over the network 120. In an example, the transaction processing module 167 transmits a receipt to the merchant POS device 130 and/or the user computing device 110 comprising a summary of the transaction.

It will be appreciated that the network connections shown are example and other means of establishing a communications link between the computers and devices can be used. Moreover, those having ordinary skill in the art having the benefit of the present disclosure will appreciate that the user computing device 110, the merchant beacon device 120, the merchant point of sale device 130, the payment processing system 140, the issuer system 150, and the account management system 160 illustrated in FIG. 1 can have any of several other suitable computer system configurations. For example, a user computing device 110 embodied as a mobile phone or handheld computer may or may not include all the components described above.

Figure 16:
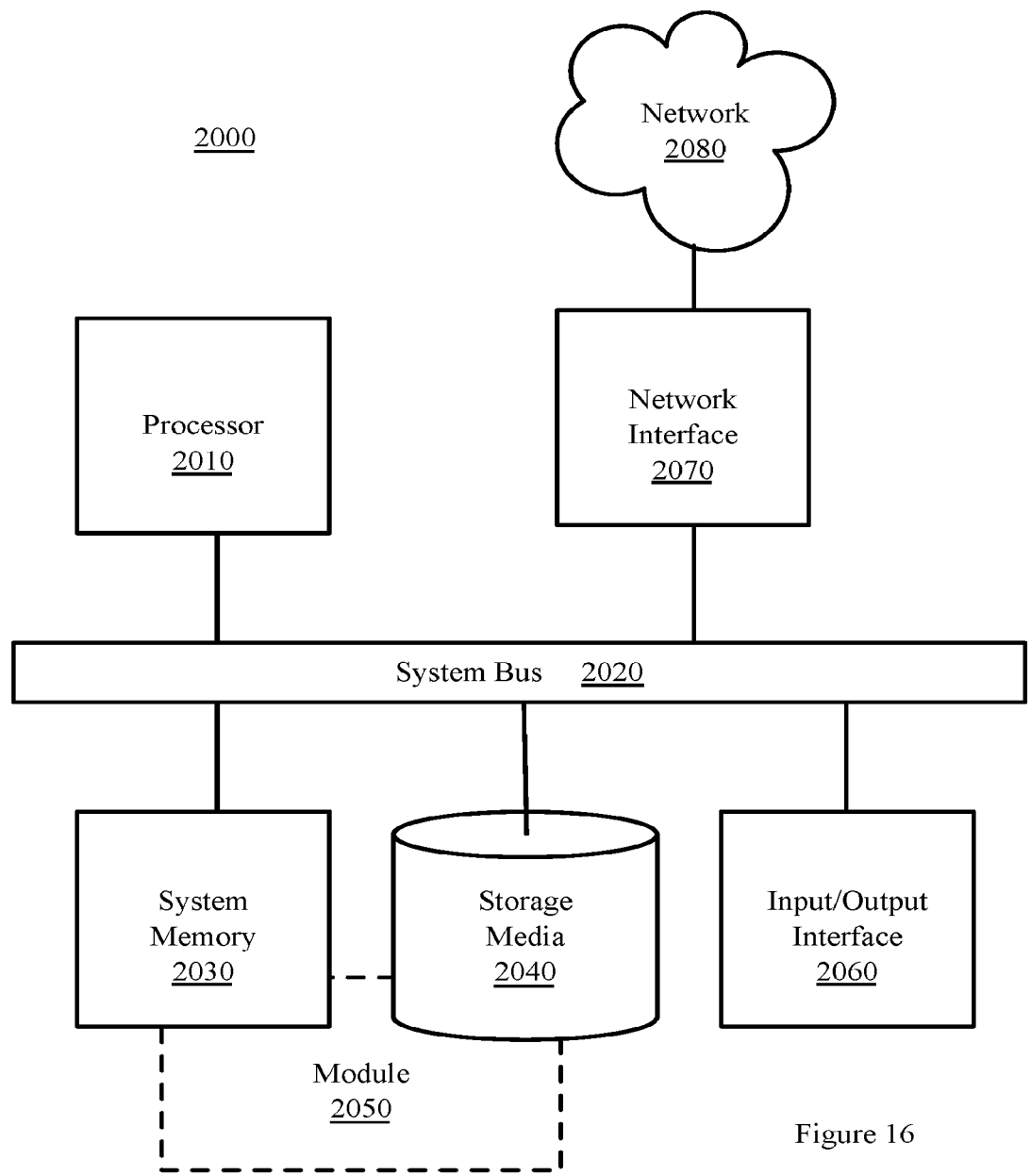
FIG. 16 is a block diagram depicting a computing machine and module, in accordance with certain examples.

In examples, the network computing devices and any other computing machines associated with the technology presented herein may be any type of computing machine such as, but not limited to, those discussed in more detail with respect to FIG. 16. Furthermore, any functions, applications, or components associated with any of these computing machines, such as those described herein or any other others (for example, scripts, web content, software, firmware, hardware, or modules) associated with the technology presented herein may by any of the components discussed in more detail with respect to FIG. 16. The computing machines discussed herein may communicate with one another, as well as with other computing machines or communication systems over one or more networks, such as network 120. The network 120 may include any type of data or communications network, including any of the network technology discussed with respect to FIG. 16.

Example Processes

The example methods illustrated in FIGS. 2-15 are described hereinafter with respect to the components of the example operating environment 100. The example methods of FIGS. 2-15 may also be performed with other systems and in other environments.

Figure 2:
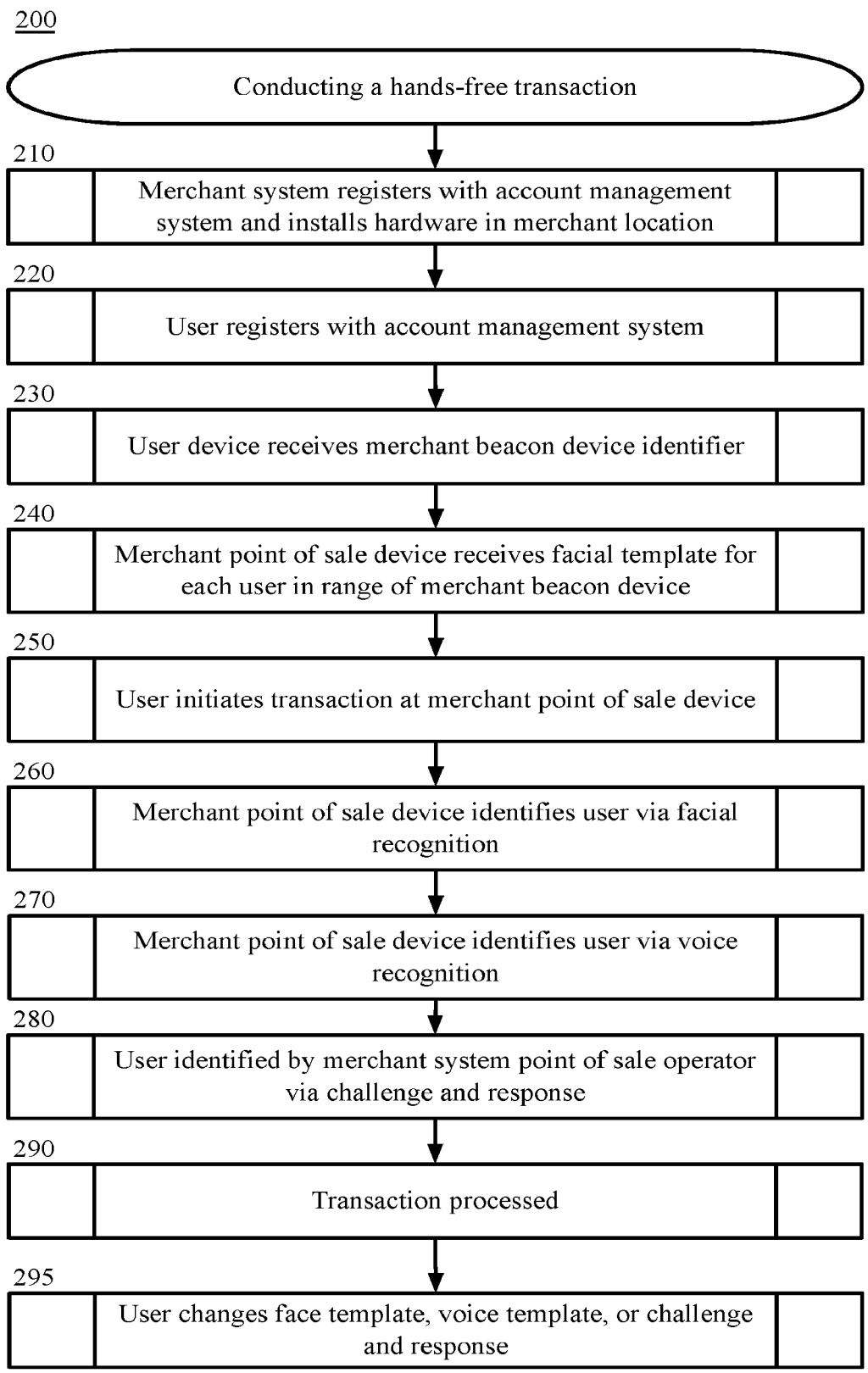
FIG. 2 is a block flow diagram depicting a method for processing hands-free transactions with facial recognition of a user and for enabling the user to update a facial template of the user for use in hands-free transactions, in accordance with certain examples.

FIG. 2 is a block diagram depicting a method 200 for conducting a hands-free transaction with facial recognition of a user 101, in accordance with certain examples. The method 200 is described with reference to the components illustrated in FIG. 1.

In block 210, the merchant system registers with the account management system 160 and installs hardware in a merchant location. The method for registering, by a merchant system, with an account management system 160 and installing hardware at a merchant system location is described in more detail hereinafter with reference to the method described in FIG. 3.

Figure 3:
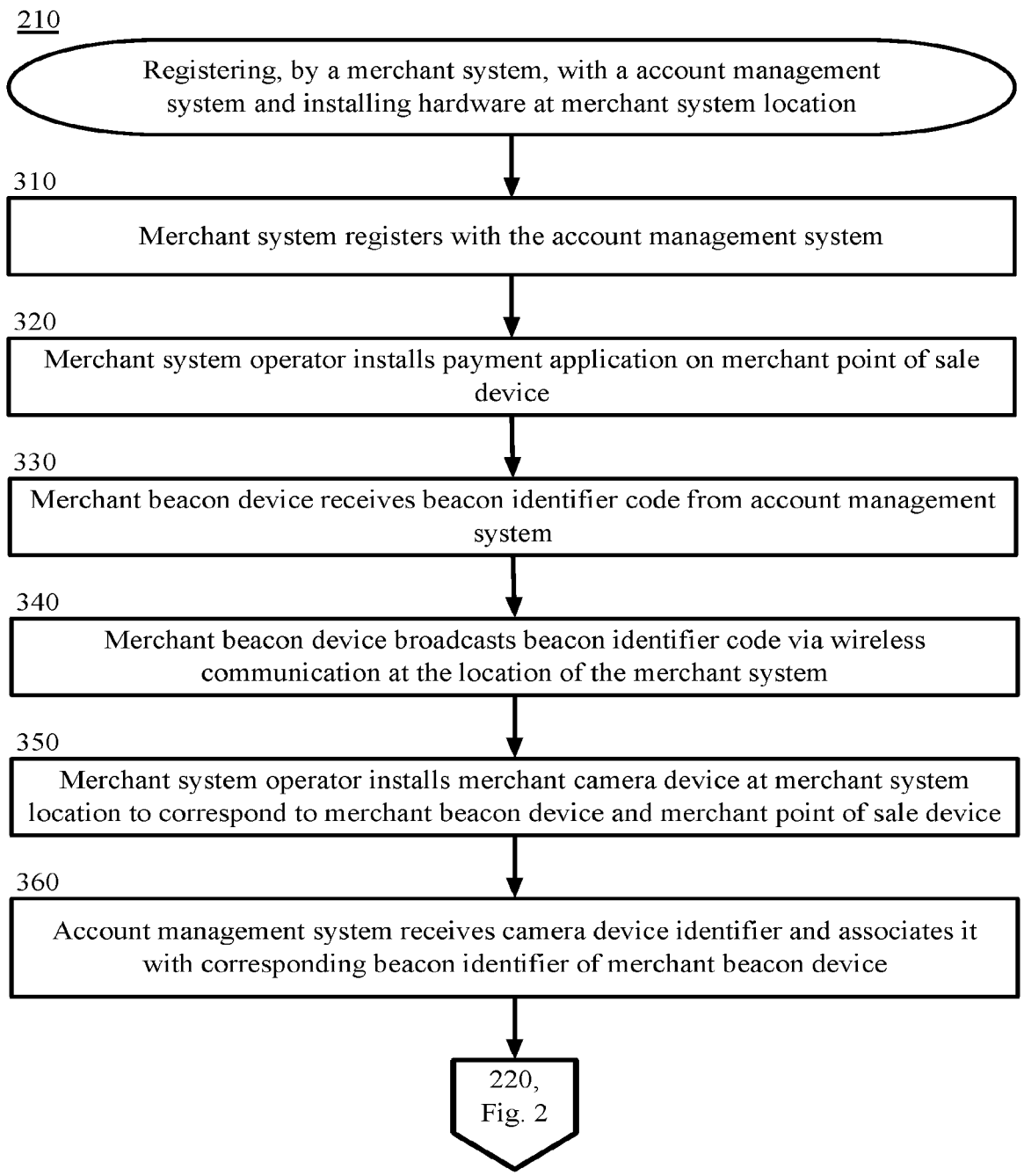
FIG. 3 is a block flow diagram depicting a method for registering, by a merchant system, with an account management system and installing hardware at a merchant system location, in accordance with certain examples.

FIG. 3 is a block diagram depicting a method 210 for registering, by a merchant system, with an account management system 160 and installing hardware at a merchant system location, in accordance with certain examples. The method 210 is described with reference to the components illustrated in FIG. 1.

In the examples described herein, the merchant system does not need to install hardware at the example merchant system location in any particular order. The method 210 describes one example method of installing hardware at the merchant location. However, the merchant system or other system installing the merchant hardware does not need to install the merchant POS device 130, the merchant camera device 140, or the merchant beacon device 120 in the order described herein.

In block 310, a merchant system registers with the account management system 160. In an example, an agent of the merchant system accesses an account management system 160 website and registers for a merchant account with the account management system 160 via the website. In an example, the merchant system adds payment account information associated with a merchant account to the merchant account managed by the account management system 160. In an example, the merchant system comprises one or more merchant system locations. For example, the merchant system may comprise one or more physical store locations. An example merchant location comprises one or more merchant point of sale ("POS") devices 130. In an example, one or more merchant POS device operators 102 operate the one or more merchant POS devices 130 at the merchant system location.

In block 320, a merchant system operator installs the payment application 133 on the merchant point of sale device 130. In another example, the merchant system operator purchases a merchant POS device 130 from the account management system 160 with the payment application 133 pre-installed on the merchant POS device 130. In an example, the merchant POS device 130 is able to communicate with the account management system 160 over a network 120. In an example, the merchant POS device 130 communicates with the account management system 160 via the payment application 133. For example, the merchant POS device 130 may be able to transmit transaction details to the account management system 160 via the payment application 133 over the network 120 to enable the account management system 160 to process a transaction. In another example, the merchant POS device 130 may be able to receive a receipt from the account management system 160 that notifies a merchant POS device operator 102 as to whether a transaction was successful or not.

In block 330, the merchant beacon device 120 receives a beacon identifier from the account management system 160. In an example, the merchant system receives a beacon identifier from the account management system 160 and installs or otherwise saves the beacon identifier on the merchant beacon device 120. In an example, a merchant system operator installs the merchant beacon device 120 in proximity to a merchant POS device 130. In an example, the merchant system operator installs a plurality of merchant beacon devices 120, each merchant beacon device 120 in proximity to one or more associated merchant POS devices 130. In an example, the merchant beacon device 120 is able to broadcast a merchant beacon identifier over a wireless medium, wherein one or more user computing devices 110 located within a threshold proximity to the merchant beacon device 120 are able to receive the merchant beacon identifier over the wireless medium. In another example, the merchant beacon device 120 is able to establish a local network 120 connection to one or more user computing devices 110 located within a threshold proximity to the merchant beacon device 120 and the merchant beacon device 120 transmits the merchant beacon identifier to the one or more user computing devices 110 over the established local network 120 connection. For example, the threshold proximity depends on the network 120 communication protocol utilized by the merchant beacon device 120.

In block 340, the merchant beacon device 120 broadcasts the beacon identifier code via wireless communication at the location of the merchant system. For example, the merchant beacon device 120 may broadcast, emit, or otherwise transmit data comprising the beacon identifier via Wi-Fi, Bluetooth, Bluetooth low energy ("BLE"), near field communication ("NFC"), or other appropriate communication protocol to one or more user computing devices 110 located at the merchant system location within a threshold proximity to the merchant beacon device 120. In some examples, the merchant beacon device 120, at a time before transmitting the merchant beacon identifier, is operable to establish a network 120 connection between the merchant beacon device 120 and one or more user computing devices 110 located at the merchant system location within a threshold proximity to the merchant beacon device 120.

In block 350, a merchant system operator installs the merchant camera device 140 at the merchant system location to correspond to the merchant beacon device 120. In an example, both a merchant camera device 140 and a merchant beacon device 120 are installed in proximity to a particular merchant POS device 130. In another example, a merchant camera device 140 and a merchant beacon device 120 are installed in proximity to two or more particular merchant POS devices 130. In an example, the merchant camera device 140 is oriented to be able to capture video and/or images of a face of a user 101 standing in front of one or more merchant POS devices 130 during the process of checkout. In an example, the merchant system installs a merchant camera device 140 that is oriented to capture video and/or images of the face of a user standing in front of a particular merchant POS device 130. In another example, the merchant system installs a merchant camera device 140 that is oriented to capture video and/or images of the faces of one or more users 101 standing within a proximity of a particular plurality of merchant POS devices 130 within a range of a field of vision of the camera module 147 of the merchant camera device 140.

In block 360, the account management system 160 receives a merchant camera device 140 identifier and associates it with the corresponding beacon identifier code of the merchant beacon device 120. In an example, the merchant system and/or the account management system 160 configures the merchant camera device 140 so that the merchant camera device 140 is able to communicate with the account management system 160 over the network 120. An example camera device 140 identifier comprises a hardware identifier, a MAC address, or other useful or relevant identifier associated with the merchant camera device 140. In an example, the account management system 160 comprises a database comprising merchant camera device 140 identifiers and associated beacon identifiers for merchant beacon device 120 identifiers for a particular merchant system location. In an example, the merchant camera device transmits the merchant beacon device 120 identifier in addition to the merchant camera device 140 identifier to the account management system 160. In an example, the merchant camera device 140, during the setup and installation process, may receive the merchant beacon device 120 identifier over an appropriate wireless communication channel from the merchant beacon device 120. In another example, the merchant camera device 140, during the setup and installation process, may establish a network 120 connection with the merchant beacon device 120 and receive the merchant beacon device 120 identifier over the network 120. In another example, the account management system 160 receives the merchant camera device 140 identifier, extracts one or more merchant beacon device 120 identifiers from the database, and associates the merchant camera device 140 identifier with one or more of the one or more extracted merchant beacon device 120 identifiers. In yet another example, the merchant system operator installs the one or more merchant beacon devices 120 after installing the one or more merchant camera devices 140. In this example, the account management system 160 generates a merchant beacon device identifier to associate with a merchant camera device 140 identifier and transmits the generated merchant beacon device identifier to the merchant system. In this example, the merchant system operator manually configures the merchant beacon device 120 to broadcast, emit, or otherwise transmit the merchant beacon device identifier assigned by the account management system 160 over a network 120.

In certain examples, one or both of the merchant camera device 140 and the merchant beacon device 120 are components of the merchant POS device 130 or are wirelessly or physically connected to the merchant POS device 130 and controlled by one or more processors of the merchant POS device 130. In certain examples, certain functions described herein as performed by the merchant camera device 140 and/or the merchant beacon device 120 may also be performed by the merchant POS device 130.

From block 360, the method 210 proceeds to block 220 of FIG. 2.

Returning to FIG. 2, in block 220, the user 101 registers with the account management system 160. The method for registering, by a user 101, for an account with an account management system 160 is described in more detail hereinafter with reference to the method 220 described in FIG. 4.

Figure 4:
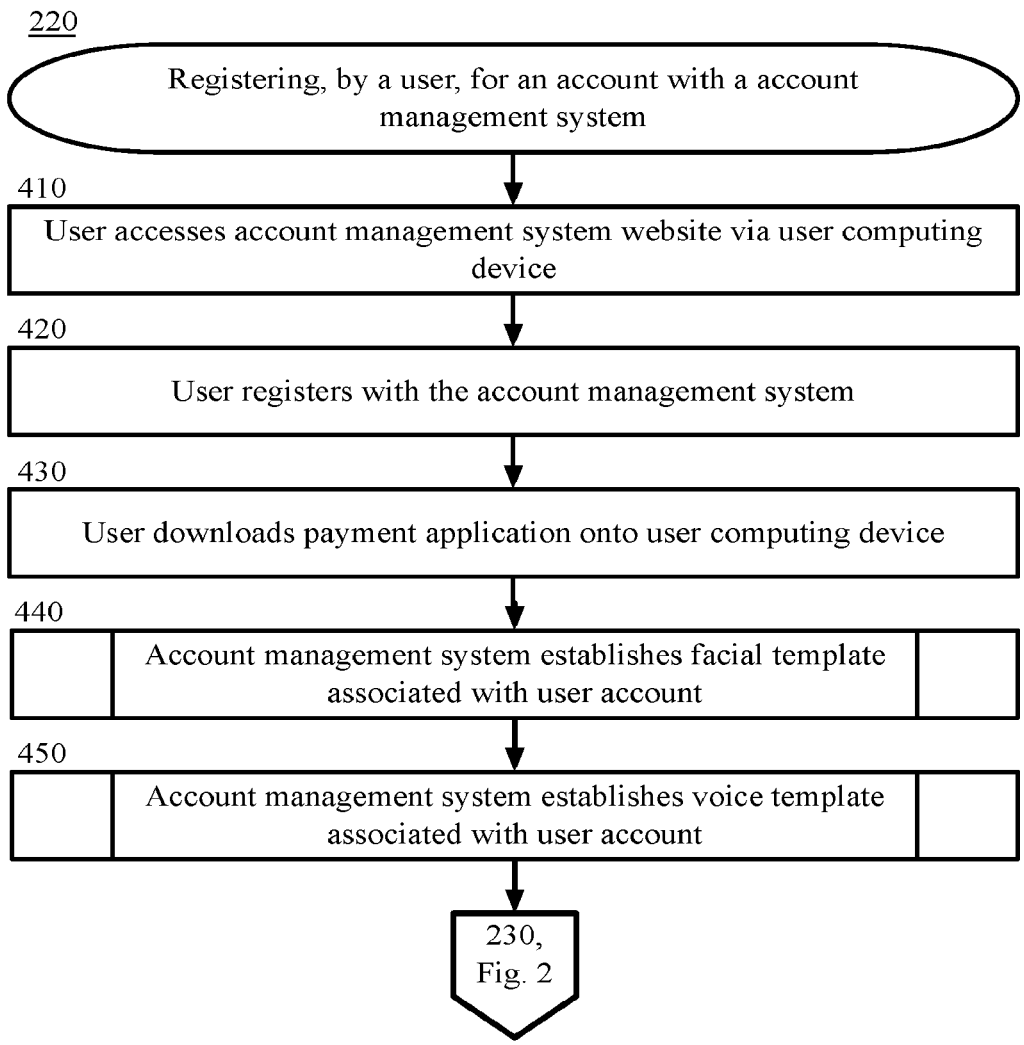
FIG. 4 is a block flow diagram depicting a method for registering, by a user, for an account with an account management system, in accordance with certain examples.

FIG. 4 is a block diagram depicting a method 220 for registering, by a user 101, for an account with an account management system 160, in accordance with certain examples. The method 220 is described with reference to the components illustrated in FIG. 1.

In block 410, the user 101 accesses the account management system website 169. For example, the user 101 accesses the account management system 160 via the web browser 118 of the user computing device 110. In another example, the user 101 may otherwise contact the account management system 160 to register for a user 101 account.

In block 420, the user 101 registers with the account management system 160. The user 101 may obtain a user account number, receive the appropriate applications and software to install on the user computing device 110, request authorization to participate in hands-free payment processing, or perform any action required by the account management system 160. The user 101 may utilize the functions of the user computing device 110, such as the user interface 115 and the web browser 118, to register and configure a user 101 account. In an example, the user 101 may enter payment account information associated with one or more user 101 accounts, for example, one or more credit accounts, one or more bank accounts, one or more stored value accounts, and/or other appropriate accounts into the user 101 account maintained by the account management system 160.

In block 430, the user 101 downloads the payment application 113 onto the user computing device 110. In an example, the payment application 113 operating on the user computing device 110 is able to communicate with the account management system 160 over the network 120. In an example, the user 101 may configure user 101 account settings or add, delete, or edit payment account information via the payment application 113. In an example, the user 101 may select an option to enable or disable the permission of the account management system 160 to process hands free transactions. For example, a hands free transaction comprises a transaction wherein the user 101 does not need to interact with the user computing device 110 or requires minimal user 101 interaction with the user computing device 110 to initiate a transaction with the merchant system.

In block 440, the account management system 160 establishes a facial template associated with the user 101 account. The method for establishing a facial template associated with a user 101 account is described in more detail hereinafter with reference to the method 440 described in FIG. 5.

Figure 5:
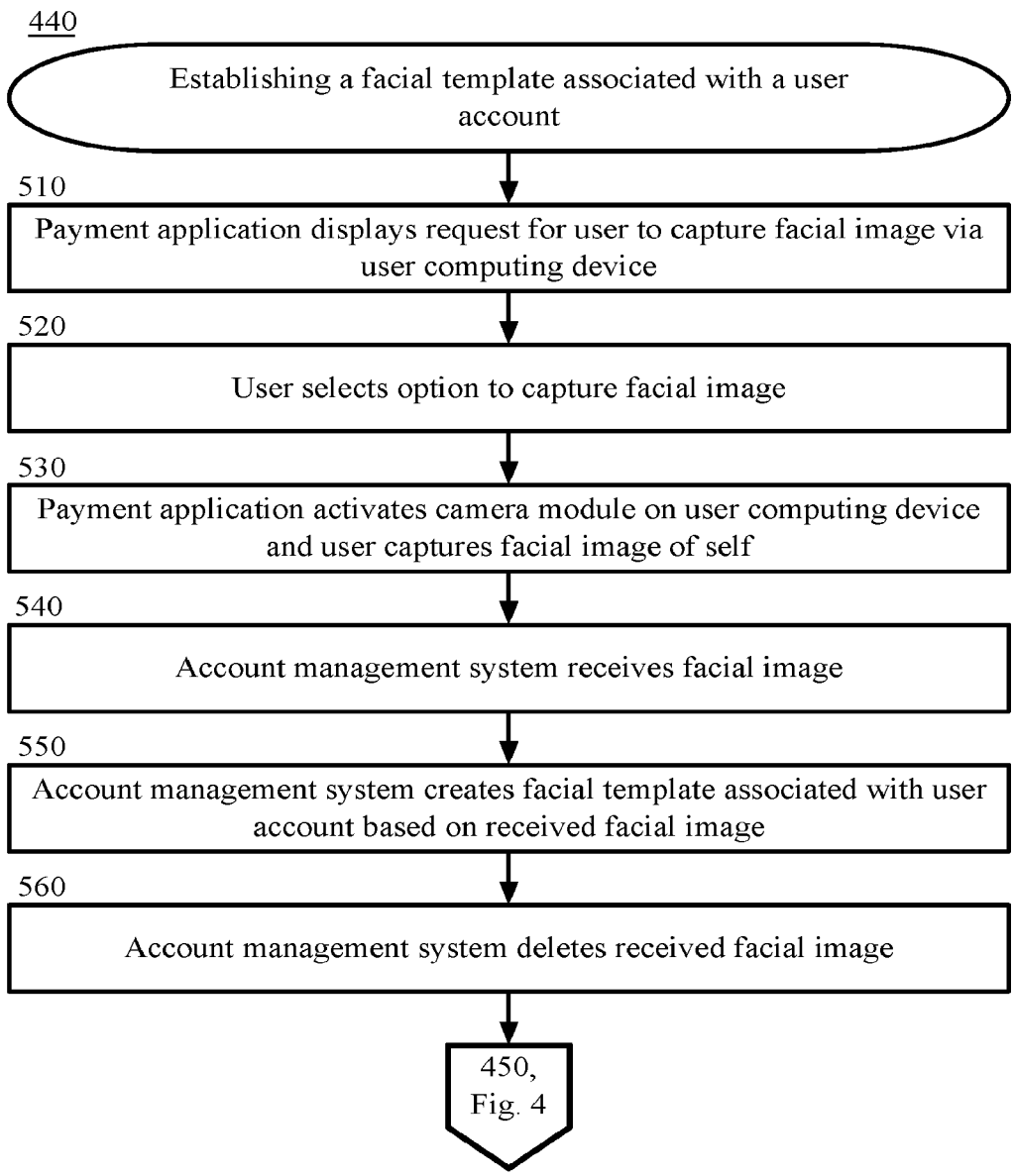
FIG. 5 is a block flow diagram depicting a method for establishing a facial template associated with a user account, in accordance with certain examples.

FIG. 5 is a block diagram depicting a method 440 for establishing a facial template associated with a user 101 account, in accordance with certain examples. The method 440 is described with reference to the components illustrated in FIG. 1.

In block 510, the payment application 113 displays a request for the user 101 to capture a facial image via the user computing device 110. In an example, the payment application 113 displays the request via the user interface 115. In an example, the user interface 115 may display a request that reads, "to enable hands free transactions, we need an image of your face. Would you like submit a facial image now?" In this example, the user 101 may select an option to take a current picture or may otherwise select a picture stored on the user computing device 110.

In block 520, the user 101 selects an option to capture a facial image. For example, the user 101 actuates an object on the user interface 115 that reads, "yes, I would like to take a picture now."

In block 530, the payment application 113 activates the camera module 117 on the user computing device 110 and the user 101 captures a facial image of himself In an example, the user computing device user interface 115 may display a live camera feed of the user 101 to aid the user 101 in aligning the user's 101 face to take the facial image. In an example, the payment application 113 may display on the user computing device 110 a box or other perimeter on the user interface 115 within which the user 101 should align his face to take a picture of a required size predetermined by the account management system 160. In an example, the user 101 may actuate an object on the user interface 115 to capture the image. In this example, in response to the user actuating the object on the user interface 115, the camera module 117 receives a command from the payment application 113 to capture an image of the user 101. In another example, the camera module 117 receives a command from the payment application 113 to capture a plurality of images of the user 101 as the user 101 moves the camera around the user's 101 face. For example, each of the plurality of images of the user 101 may correspond to a particular pose of the user's 101 face. An example facial image may comprise a digital image of the face of a user 101. In an example, the account management system 160 may establish guidelines for users 101 in submitting facial images. For example, the payment application 113 may direct the user 101 to remove any hats, head coverings, glasses, or other objects or accessories that may occlude regions of the user's 101 face so that payment application 160 may receive a complete depiction of the user's 101 face.

In an example, the user computing device 110 determines if the captured facial image is a valid facial image or an invalid facial image. For example, a valid facial image complies with guidelines predetermined by the account management system 160 and an invalid facial image does not comply with one or more of the guidelines. For example, if the user computing device 110 captures a facial image that comprises incorrect dimensions, if part or all of the user's 101 face is occluded, or if the image is too dark or too bright, the user computing device 110 rejects the invalid facial image and displays a request directing the user 101 to capture a subsequent facial image. In this example, the user 101 captures a subsequent facial image via the user computing device 110, and the user computing device 110 transmits the subsequent facial image to the account management system 160 via the network 120.

In block 540, the account management system 160 receives the facial image. In another example, the account management system 160 receives a plurality of facial images of the user 101. For example, the payment application 113 transmits the one or more facial images of the user 101 to the account management system 160 via the network 120. In an example, the account management system 160 associates the received one or more facial images with the user 101 account. For example, the account management system 160 is able to identify the user 101 account to associate with the received one or more images because the user 101 is currently logged in to the payment application 113 on the user computing device 110 at the time the one or more facial images are transmitted to the account management system 160. In certain examples, the account management system 160 determines if the received facial image is a valid facial image or an invalid facial image. For example, a valid facial image complies with all guidelines predetermined by the account management system 160 and an invalid facial image does not comply with one or more of the guidelines. For example, if a user 101 submits a facial image that comprises incorrect dimensions, if part or all of the user's 101 face is occluded, or if the image is too dark or too bright, the account management system 160 rejects the invalid facial image and transmits a request to the user computing device 110 directing the user 101 to capture a subsequent facial image to transmit to the account management system 160. In this example, the user computing device 110 receives and displays the request, the user 101 captures a subsequent facial image via the user computing device 110, and the user computing device 110 transmits the subsequent facial image to the account management system 160 via the network 120. In another example, the user 101 submits a facial image that is not of a face and the account management system 160 or payment application 113 determines, via facial recognition, that the image is not of a face, the account management system 160 or payment application 113 rejects the invalid facial image and transmits a request to the user computing device 110 for display by the user computing device 110 directing the user 101 capture a subsequent facial image to transmit to the account management system 160. In this example, the user computing device 110 receives and displays the request, the user 101 captures a subsequent facial image via the user computing device 110, and the user computing device 110 transmits the subsequent facial image to the account management system 160 via the network 120. In yet another example, the user 101 submits a facial image that is of a face but the account management system 160 or payment application 113 determines that the image, based on one or more image metrics such as image resolution, is not of a minimum quality standard, and the account management system 160 or payment application 113 rejects the invalid facial image and transmits a request to the user computing device 110 for display by the user computing device 110 directing the user 101 capture a subsequent facial image to transmit to the account management system 160. In this example, the user computing device 110 receives and displays the request, the user 101 captures a subsequent facial image via the user computing device 110, and the user computing device 110 transmits the subsequent facial image to the account management system 160 via the network 120.

In block 550, the account management system 160 creates a facial template associated with the user 101 account based on the received facial image. In another example, the account management system 160 generates a corresponding facial template for each of a plurality of received facial images associated with the user 101 account. In an example, the facial template is of a predetermined size, for example, a 128-byte facial template. In an example, the account management system 160 generates a facial template comprising a computer code representation of the digital facial image. For example, the facial template may describe key features of the facial image of the user 101, such as shape, color, line, value, space, form, texture, or other useful or relevant feature of the image or of particular regions of the image. In an example, the facial template is generated by processing the facial image through a convolutional neural network. In an example, the account management system 160 stores the generated facial template associated with the user 101 in a data storage unit 166 associated with the account management system 160. For example, the account management system 160 database may comprise a table or other means by which it correlates each user 101 account identifier with an associated facial template of the user 101.

In another example, after the user computing device 110 captures one or more facial images of the user 101, the user computing device 110 generates one or more facial templates corresponding to one or more of the one or more captured facial images of the user 101. In this example, the user computing device 110 transmits the one or more generated facial templates to the account management system 160 over the network 120.

In block 560, the account management system 160 deletes the received facial image. For example, the account management system 160 only uses a facial template comprising a computer code representation of the facial image of the user 101. In another example, the account management system 160 saves the received facial image for future processing. For example, the account management system 160, at a later time, updates a facial template generation algorithm and generates an updated facial template corresponding to the saved facial image.

From block 560, the method 440 proceeds to block 450 in FIG. 4.

Returning to block 450, in FIG. 4, the account management system 160 establishes an audio template associated with the user 101 account. The method for establishing an audio template associated with a user 101 account is described in more detail hereinafter with reference to the method 450 described in FIG. 6.

Figure 6:
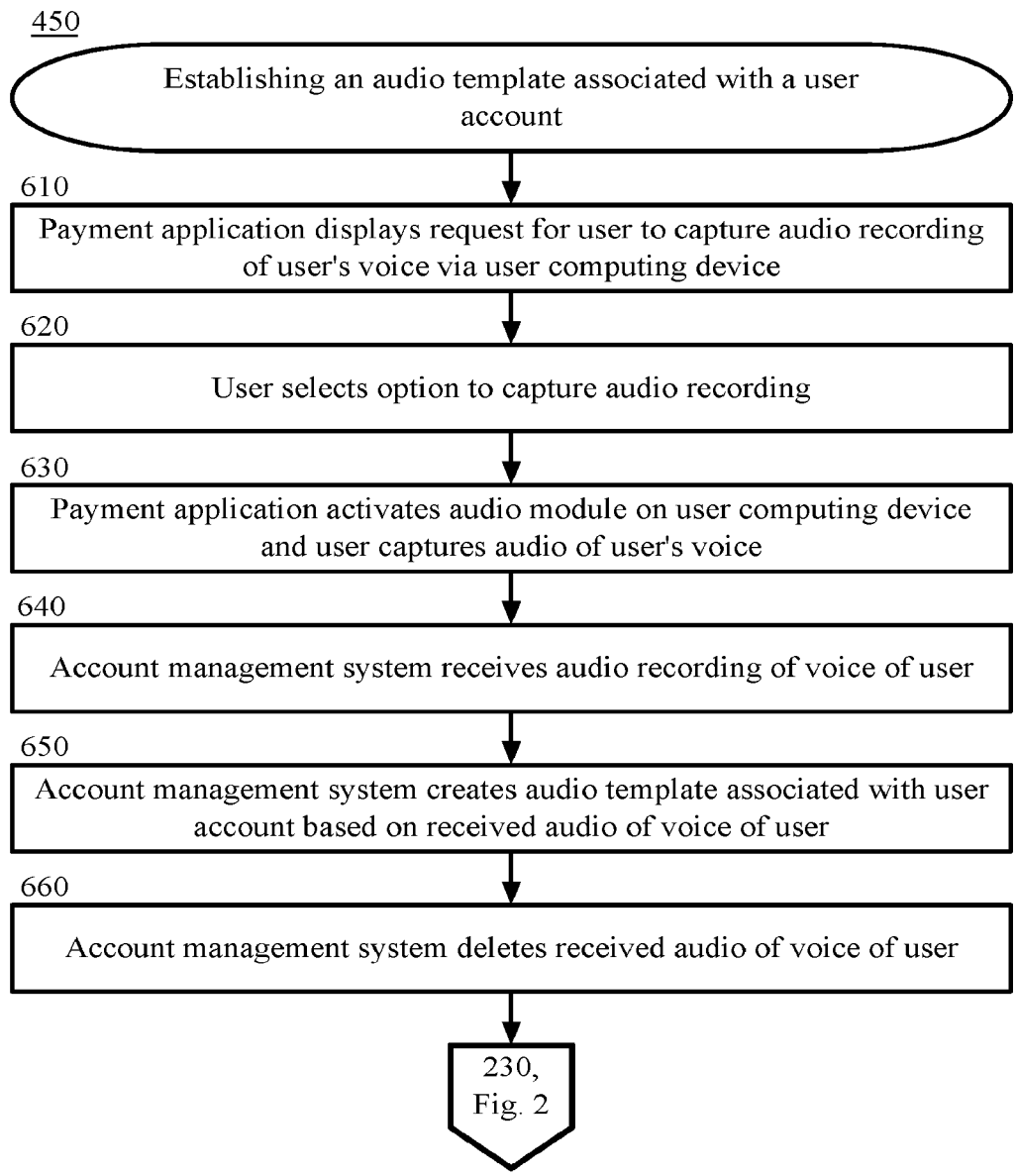
FIG. 6 is a block flow diagram depicting a method for establishing an audio template associated with a user account, in accordance with certain examples.

FIG. 6 is a block diagram depicting a method 450 for establishing an audio template associated with a user 101 account, in accordance with certain examples. The method 450 is described with reference to the components illustrated in FIG. 1.

In block 610, the payment application 113 displays a request for the user 101 to capture an audio recording of the user's 101 voice via the user computing device 110. In an example, the payment application 113 displays the request via the user interface 115. In an example, the user interface 115 may display a request that reads, "to enable hands free transactions, we need recording of your voice. Would you like submit an audio recording now?" In this example, the user 101 may select an option to submit a live audio recording or may otherwise select a pre-recorded audio recording of the user 101 stored on the user computing device 110.

In block 620, the user 101 selects an option to capture an audio recording. For example, the user 101 actuates an object on the user interface 115 that reads, "yes, I would like to submit an audio recording now."

In block 630, the payment application 113 activates an audio module (not depicted) on the user computing device 110 and the user 101 captures an audio of the user's 101 voice. In an example, the user computing device user interface 115 may display guidelines received from the account management system 160 to aid the user 101 in submitting an audio recording. For example, the payment application 113 may display directions for the user 101 to record the user's 101 voice saying the user's 101 name. In another example, the payment application 113 directs the user 101 to capture an audio recording to establish a voice password that can be used in hands-free transactions of the user 101. In an example, the user 101 may actuate an object on the user interface 115 to capture or record a live audio recording. In this example, in response to the user actuating the object on the user interface 115, the audio module receives a command from the payment application 113 to capture an audio recording of the user 101. In an example, the account management system 160 may establish guidelines for users 101 in submitting audio recordings. For example, the payment application 113 may direct the user 101 to submit an audio recording no longer than a predefined maximum length of duration. For example, the audio recording must be no longer than five seconds. In another example, the payment application 113 may direct the user 101 submit an audio recording lasting a predefined length of time, for example, an audio recording lasting five seconds. In an example, after the user 101 initiates an audio recording by actuating an object of the user interface 115, the payment application 113 transmits a command to the audio module to stop recording the user's 101 voice after the predefined length of time or predefined maximum length of time has expired.

In block 640, the account management system 160 receives an audio recording of the voice of the user 101. For example, the payment application 113 or audio module transmits the audio recording to the account management system 160 over the network 120. In another example, the payment application 113 retrieves an audio recording selected by the user 101 and saved in the data storage unit 116 and transmits the retrieved audio recording to the account management system 160 over the network 120.

In block 650, the account management system 160 creates an audio template associated with the user's 101 voice based on the received audio of the voice of the user. In an example, the audio template is of a predetermined size. In an example, the account management system 160 generates an audio template comprising a computer code representation of the user's 101 audio recording. For example, the audio template may describe key features of the audio recording of the user 101, such as the intonation of the user's 101 voice or other features of the user's 101 voice. In an example, the account management system 160 stores the generated audio template associated with the user 101 in a data storage unit 166 associated with the account management system 160. For example, the account management system 160 database may comprise a table or other means by which it correlates each user 101 account identifier with an associated audio template of the user 101.

In block 660, the account management system 160 deletes the received audio of the voice of the user 101. In an example, the account management system 160 deletes the received audio recording of the user 101 to protect the privacy of the user 101. For example, the account management system 160 only uses an audio template comprising a computer code representation of the audio recording of the user 101.

From block 660, the method 440 proceeds to block 230 in FIG. 2.

Returning to block 230, in FIG. 2, the user device receives a merchant beacon device 120 identifier. The method for receiving, by a user computing device 110, a merchant beacon identifier broadcast by a merchant beacon device 120 is described in more detail hereinafter with reference to the method 240 described in FIG. 7.

Figure 7:
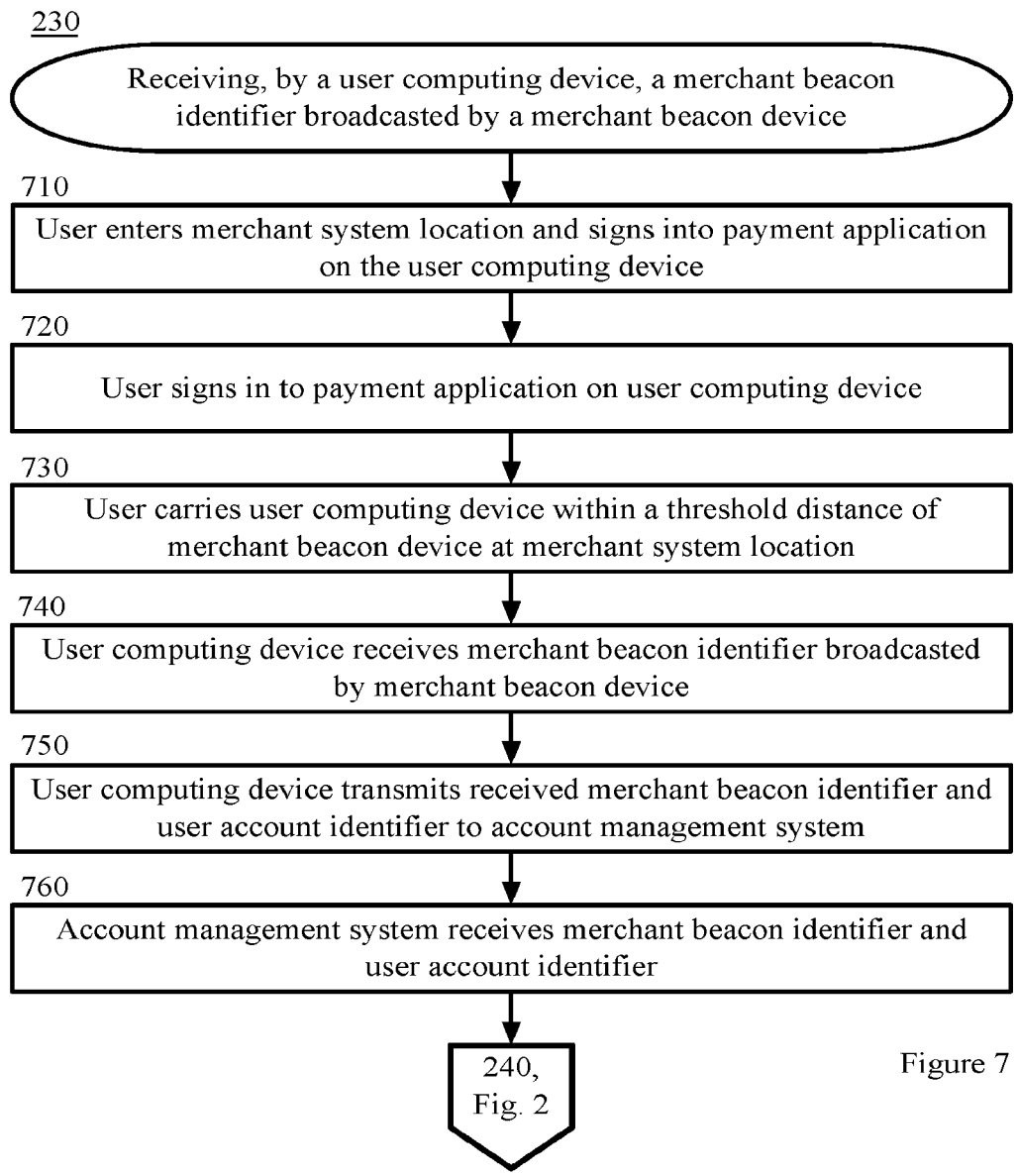
FIG. 7 is a block flow diagram depicting a method for receiving, by a user computing device, a merchant beacon identifier broadcasted by a merchant beacon device, in accordance with certain examples.

FIG. 7 is a block diagram depicting a method 240 for receiving, by a user computing device 110, a merchant beacon identifier broadcast by a merchant beacon device 120, in accordance with certain examples. The method 240 is described with reference to the components illustrated in FIG. 1.

In block 710, the user 101 enters the merchant system location and signs into the payment application 113 on the user computing device 110. In another example, the user 101 signs into the payment application 113 at a time before entering the merchant system location and enters the merchant location carrying the user computing device 110 signed into the payment application 113.

In block 720, the user 101 signs in to the payment application 113 on the user computing device 110. In an example, the user 101 may have a username and password associated with the user 101 account maintained by the account management system 160. In an example, the user 101 opens the payment application 113 on the user computing device 110 and enters a username and/or password via the user interface 115 to sign in to the payment application 113. In an example, when the user 101 is signed in to the payment application 113, the payment application is able to communicate with the account management system 160 over the network 120. In this example, when the user 101 is not signed in to the payment application 113, the payment application does not communicate with the account management system 160 even if the a network 120 connection is available. In an example, the user 101 may sign out of the payment application 113 at any time by actuating one or more objects on the user interface 115 of the user computing device 110. In an example, after signing in to the payment application 113, the user 101 configure one or more user 101 account settings, add, edit, or delete user 101 payment account information, and/or change user 101 preferences. In certain examples, a user 101 may be required to make a feature selection to obtain the benefits of the techniques described herein. For example, the user 101 may have to enable one or more user 101 account settings to enable hands free transactions according to the methods described herein.

In an example, payment application 113 may provide options, data, configurable alerts, and other suitable features to the user 101. For example, the payment application 113 may comprise a listing of merchant systems and merchant locations that participate in hands free payment transactions according to one or more of the methods described herein. The listing may be updated periodically from the account management system 160. The payment application 113 may notify the user 101 when the user 101 is within a configured vicinity of a participating merchant system. The payment application 113 may provide the user 101 with options to update payment preferences. The payment application 113 may provide the user 101 with a listing of recent transactions. The payment application 113 may provide any other suitable information to the user 101.

In block 730, the user 101 carries the user computing device 110 within a threshold distance of the merchant beacon device 120 at the merchant system location. In an example, the user 101 enters a location of the merchant system. The user 101 may enter the merchant location carrying the user computing device 110 in a pocket or a bag, in the hands of the user 101, or in any suitable manner. The location of the merchant system may be a store location, a kiosk location, or any suitable physical location of a merchant system. In another example, a merchant POS operator 102 may be mobile and arrive at a location of the user 101. For example, the merchant system may be a restaurant and the merchant POS device operator 102 may be a delivery person possessing a portable merchant POS device 130.

In certain examples, the payment application 113 may alert the user 101 when the user 101 is in the vicinity of a merchant system that accepts hands-free payments. The alert may be provided via a message on the user computing device 110, via an email or a text, or in any suitable manner. In an example, the alert may be based on the location of the user 101 as determined by a GPS module (not depicted) resident on the user computing device 110. For example, the payment application 113 accesses the GPS data from the GPS module and compare the GPS location to a list of locations of merchant systems that accept hands free payments. For example, the payment application 113 comprises a list or accesses a list maintained by the account management system 160 of merchant system locations that accept hands free payments. If a match results from the comparison, then an alert is generated and provided to the user 101. The match may result if the user 101 is within a configured distance of a qualified merchant system location. In an example, the alerts may be configured to alert in any suitable manner. In an example, the alerts may be combined in commercially dense environments or the alerts may be presented individually. In another example, the alerts may be configured to only alert the user 101 a configured number of times. For example, the alert may be presented three times, but upon a fourth instance, the alert is not presented. The alerts may be presented as a notification with an audible alert, a vibration, a popup alert on the user interface 115 of the user computing device 110, or other suitable alert.

In block 740, the user computing device 110 receives a merchant beacon identifier broadcast by the merchant beacon device 120. The user computing device 110 recognizes a merchant beacon device 120 via wireless communication at the location of the merchant system. The user computing device 110 may be configured to search for beacons or other wireless signals. In an example, the user computing device 110 and the merchant beacon device 120 establish a BLE wireless network 120 connection. In other examples, the user computing device 110 and the merchant beacon device 120 establish a Bluetooth, Wi-Fi, NFC, or other appropriate network 120 connection. Upon entering the range of the signal of the merchant beacon device 120, the user computing device 110 receives the merchant beacon identifier.

In block 750, the user computing device 110 transmits the received merchant beacon identifier and a user 101 account identifier to the account management system 160. In an example, the user computing device 110 transmits the data received in the merchant beacon identifier along with a user 101 account identifier to the account management system 160 over the network 120.

In block 760, the account management system 160 receives the merchant beacon identifier and the user 101 account identifier. For example, the account management system 160 receives the merchant beacon identifier and the user 101 account identifier over the network 120. The user computing device 110 may compare the data from the merchant beacon identifier to a database of merchant beacon identifier data and merchant camera device identifier data to determine an identity of the merchant system and merchant camera device 140 associated with the merchant beacon identifier and/or to verify the authenticity of the beacon.

From block 760, the method 230 proceeds to block 240 in FIG. 2.

Returning to FIG. 2, in block 240, the merchant point of sale device 130 receives a facial template for each user 101 in range of the merchant beacon device 120. The method for receiving, by a merchant camera device 140, a facial template for each user 101 in range of the merchant beacon device 120 is described in more detail hereinafter with reference to the method 240 described in FIG. 8. In other examples, in addition to or instead receiving the facial template, the merchant point of sale device 130 receives an audio template and/or a challenge and response associated with the user 101 account.

Figure 8:
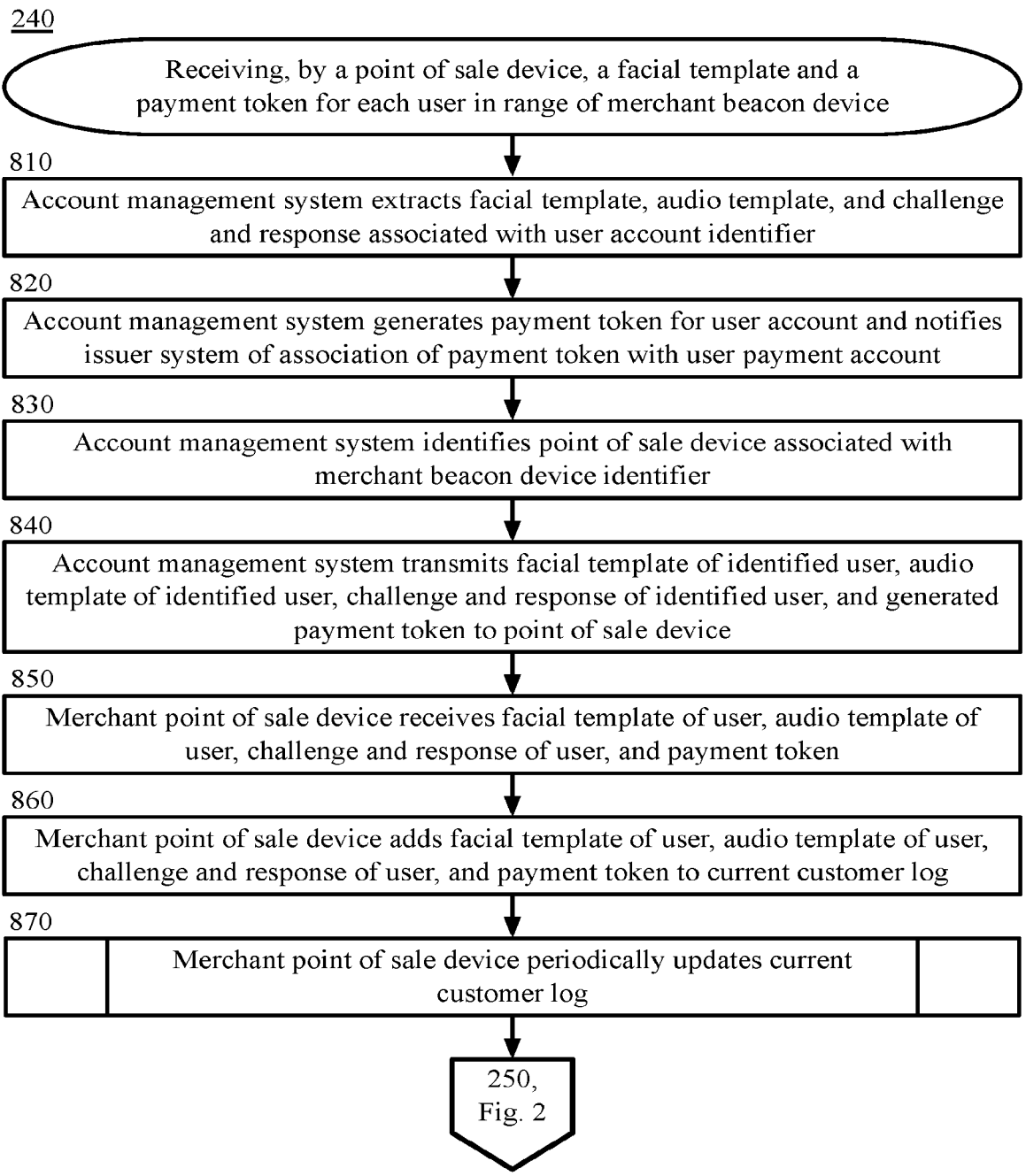
FIG. 8 is a block flow diagram depicting a method for receiving, by a point of sale device, a facial template and a payment token for each user in range of a merchant beacon device, in accordance with certain examples.

FIG. 8 is a block diagram depicting a method 240 for receiving, by a merchant camera device 140, a facial template for each user 101 in range of the merchant beacon device 120, in accordance with certain examples. The method 240 is described with reference to the components illustrated in FIG. 1. In other examples, in addition to or instead receiving the facial template, the merchant point of sale device 130 receives an audio template and/or a challenge and response associated with the user 101 account according to a similar method.

In block 810, the account management system 160 extracts a facial template, audio template, and/or challenge and response associated with the user 101 account identifier. In an example, the account management system 160 accesses a database comprising stored facial templates of a plurality of users 101 with corresponding user 101 account identifiers for each user 101. For example, this database is stored in the data storage unit 166. In another example, the account management system 160 extracts an audio template and/or a challenge and response instead of or in addition to the facial template from the database.

In block 820, the account management system 160 generates a payment token for a user payment account and notifies an issuer system of association of the payment token with the user payment account. In an example, the account management system 160 generates a payment token for each user 101 whose user computing device 110 is in network range of the merchant beacon device 120 and who is signed in to the payment application 113. An example payment token comprises a series of alphanumeric and/or symbolic characters. The example payment token may be associated with a payment account of the user 101 and be recognizable by an issuer system 150 associated with the payment account of the user 101. For example, the account management system 160 generates the payment token and communicates the payment token to an issuer system 150 associated with a payment account of the user 101 along with the user 101 payment account information. In this example, if the issuer system 150, at a later time after receiving the payment token from the account management system 160, receives the payment token from a point of sale device 130 in a payment transaction, the issuer system 150 is able to extract the user 101 payment account information associated with the payment token.

In some examples, the account management system 160 may place restrictions on payment tokens for security reasons or according to one or more configurations of the user 101 account desired by the user 101. For example, the payment token may only be valid for a preconfigured length of time, for example, one hour. In another example, the payment token may only be valid for us in a transaction between the user 101 and a particular merchant system. In yet another example, the payment token is only valid for use within a particular geographic boundary or within a threshold distance from a geographic point. In an example, the account management system 160 communicates one or more of these example restrictions to the issuer system 150 along with the payment token and the issuer system 150 associates these one or more restrictions with the payment token and the user 101 payment account data in a database of the issuer system 150. In an example, the account management system 160 may communicate, to the issuer system 150 along with the payment token and the user 101 account data, a current time stamp representing a time when the payment token was generated to associate with the payment token. In another example, the account management system 160 may communicate, to the issuer system 150 along with the payment token and the user 101 account data, location data describing geographic boundaries and/or threshold distances from geographic points where the payment token may be used in a transaction. In yet another example, the account management system 160 may communicate, to the issuer system 150 along with the payment token and the user 101 account data, a merchant system identifier and instructions that only payment authorization requests originating from merchant systems comprising the merchant system identifier may be approved. In an example, the issuer system 150 associates the payment token, the user 101 payment account data associated with the payment token, the one or more restrictions placed on the payment token by the account management system 160, and/or one or more of location data, time stamp data, merchant system identifier data, or other data that the issuer system 150 may use to determine whether the one or more restrictions on the payment token are satisfied to enable use of the payment token.

In block 830, the account management system 160 identifies a merchant point of sale device 130 associated with the merchant beacon device 120 identifier. In an example, the account management system 160 recognizes that the merchant beacon identifier is associated with the account management system 160 and a particular merchant point of sale device 130 at the merchant system location. In an example, the account management system 160 recognizes that the merchant beacon identifier is associated with a plurality of merchant point of sale device 130 installed at a particular merchant location.

In block 840, the account management system 160 transmits the facial template of the identified user 101, the audio template of the identified user 101, and/or the challenge and response associated with the identified user 101 along with the generated payment token to the merchant point of sale device 130 associated with the merchant beacon device 120 identifier. In another example, the account management system 160 transmits the facial template of the identified user 101 and the generated payment token to a plurality of merchant point of sale devices 130 associated with the merchant beacon device 120 identifier. In certain examples, the account management system 160 receives, in real time, a plurality of transmissions from user computing devices 101 corresponding to a plurality of users 101 present at the merchant system location, each transmission comprising a user 101 account identifier and a retransmitted merchant beacon identifier. In these examples, the account management system 160 retrieves, in response to receiving each such transmission, a facial template associated with the received user 101 account identifier and transmits a facial template to one or more merchant point of sale devices 130 at the merchant location associated with the merchant beacon identifier. In other examples, in addition to or instead transmitting facial template, the account management system 160 transmits an audio template and/or a challenge and response associated with the user 101 account to one or more merchant point of sale devices 130.

In block 850, the merchant point of sale device 130 receives the facial template of the user 101. In another example, in addition to or instead receiving the facial template, the merchant point of sale device 130 receives an audio template and/or a challenge and response associated with the user 101 account. In another example, a plurality of merchant point of sale devices 130 receive the facial template of the user 101. In yet another example, the merchant point of sale devices and/or the plurality of merchant point of sale devices 130 receive one or more additional facial templates, audio templates, and/or challenges and responses from the account management system 160 corresponding to one or more users 101 other than the instant user 101 having user computing devices 110 in network 120 connection to a merchant beacon device 120 according to the method previously described herein. For example, the one or more additional facial templates, audio templates, and/or challenges and associated responses are received in real time from the account management system 160 as additional users 101 other than the instant user 101 receive the merchant beacon device 120 identifier over a wireless communication network 120 or otherwise establish a network 120 connection between their user computing devices 110 and one or more merchant beacon devices 120. For example, the one or more merchant point of sale devices 130 may receive one or more additional facial templates, audio templates, and/or challenges and responses corresponding to one or more additional users 101 at a time before, at the same time, or after the time at which the merchant point of sale devices 130 receives the facial template of the instant user 101.

In block 860, the merchant point of sale device 130 adds the facial template of the user 101 to a current customer log. In an example, the merchant point of sale device 130, in addition to or instead of the facial template of the user 101, the merchant point of sale device 130 adds an audio template and/or a challenge and response associated with the user 101 to the current customer log. In an example, the current customer log is accessible by the merchant point of sale device 130 and by the account management system 160. In an example, the merchant point of sale device 130 maintains the current customer log on the merchant point of sale device 130 or on a computing device logically connected to the merchant point of sale device 130.

In block 870, the merchant point of sale device 130 periodically updates the current customer log. The method for updating, by a merchant point of sale device 130, a current customer log as users 101 enter or leave a network range of a merchant beacon device 120 is described in more detail hereinafter with reference to the method 870 described in FIG. 9.

Figure 9:
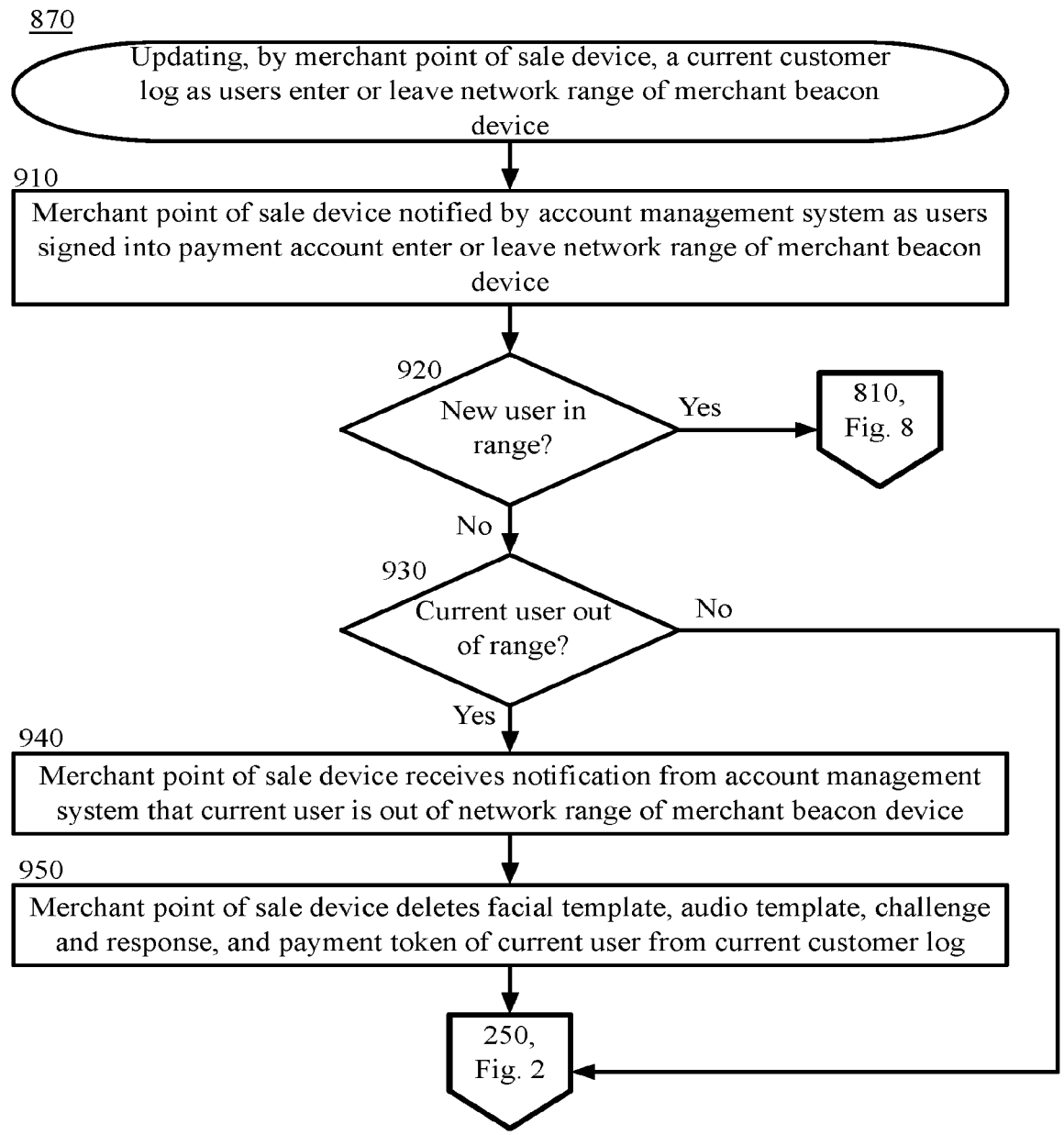
FIG. 9 is a block flow diagram depicting a method for updating, by a merchant point of sale device, a current customer log as users enter or leave a network range of a merchant beacon device, in accordance with certain examples.

FIG. 9 is a block diagram depicting a method 870 for receiving, by a merchant camera device 140, notification from an account management system 160 as users 101 enter or leave a network range of a merchant beacon device 120, in accordance with certain examples. The method 870 is described with reference to the components illustrated in FIG. 1.

In block 910, the merchant point of sale device 130 is notified by the account management system 160 as users 101 signed into a payment account enter or leave a network range of the merchant beacon device 120. For example, as previously discussed, when a user 101 carrying a user computing device 110 enters a threshold distance from a merchant beacon device 120, the merchant beacon device 120 or the user computing device 110 of the user 101 are able to detect the other device and establish a wireless network 120 connection between the two devices at the merchant system location. In this example, the merchant beacon device 120 transmits the merchant beacon identifier corresponding to the merchant beacon device 120 over the wireless network 120 to the user computing device 110. For example, the merchant beacon device 120 transmits the merchant beacon identifier to the user computing device 110 via a BLE, Bluetooth, Wi-Fi, or NFC wireless communication network 120. In this example, the user computing device 110 retransmits the received merchant beacon identifier to the account management system 160 along with a user 101 account identifier identifying the user 101.

In block 920, the account management system 160 determines whether a new user 101 is in range of the merchant beacon device 120. For example, if the account management system 160 receives a new user 101 account identifier in addition to the same merchant beacon identifier, the account management system 160 may determine that a new user 101 is in range of the merchant beacon device 120. In this example, the account management system 160 may infer that the new user 101 has entered the merchant location based on receipt of the new user 101 account identifier. In another example, if the account management system 160 does not receive any new user 101 account identifiers along with the same merchant beacon identifier within a threshold length of time, the account management system 160 may determine that no new users 101 have entered the network 120 range of the merchant beacon device 120.

If a new user 101 is in range of the merchant beacon device 120, the method 860 proceeds to block 830 in FIG. 8. For example, the account management system 160 receives a new user 101 account identifier in addition to the same merchant beacon identifier. In this example, the account management system 160 infers that the new user 101 has entered the merchant location based on receipt of the new user 101 account identifier and the same merchant beacon identifier as previously received from the first user 101.

Returning to FIG. 8, in block 810, the account management system 160 extracts a facial template associated with the new user 101 account identifier. In another example, the account management system 160, in addition to or instead of the facial template associated with the new user 101, the account management system 160 extracts an audio template and/or a challenge and response associated with the new user 101. In an example, the account management system 160 transmits the facial template, audio template, and/or challenge and response to the appropriate one or more merchant point of sale devices 130 and the one or more merchant point of sale devices 130 add the new user's 101 facial template, audio template, and/or challenge and response to the current customer log according to the example method previously described in method 250 in FIG. 8.

Returning to FIG. 9, in block 920, if there is a not a new user 101 in range of the merchant beacon device 120, the method 870 proceeds to block 930. For example, the account management system 160 does not receive any new user 101 account identifiers along with the same merchant beacon identifier within a threshold length of time and determines that no new users 101 have entered the network 120 range of the merchant beacon device 120.

In block 930, the merchant camera device 140 determines whether a current user 101 has moved out of range of the merchant beacon device 120. In an example, the user computing device 110 continues to receive from the merchant beacon identifier from the merchant beacon device 120 and retransmit the merchant beacon identifier along with the user 101 account identifier to the account management system 160. In this example, the user computing device 110 may periodically transmit information comprising the merchant beacon identifier and user 101 account identifier to the account management system 160 as long as the user computing device 110 continues to detect the merchant beacon device 120 and receive the merchant beacon device 120 identifier via periodic scans. For example, the user computing device scans for the merchant beacon device 120 every five seconds. In another example, the user computing device 110 may periodically transmit information comprising the merchant beacon identifier and user 101 account identifier to the account management system 160 as long as the user computing device 110 maintains a wireless network 120 connection with the merchant beacon device 120. For example, the user computing device 110 may transmit this information to the account management system 160 at every five seconds. In this example, if the account management system 160 ceases to receive the information from the user computing device for a predefined number of intervals, the account management system 160 may determine that the corresponding user 101 has moved out of range of the merchant beacon device. In this example, if the account management system 160 continues to receive the information transmitted by the user computing device 110 at the expected intervals, the account management system 160 determines that the user 101 is still in network 120 range of the merchant beacon device 120.

If no current user 101 has moved out of range of the merchant beacon device 120, the method 870 proceeds to block 250 in FIG. 2. For example, the account management system 160 continues to receive the merchant beacon identifier and user 101 account identifier transmitted by the user computing device 110 at the expected intervals and determines that the user 101 is still in network 120 range of the merchant beacon device 120.

Returning to block 250, in FIG. 2, the user 101 initiates a transaction at the merchant POS device 130.

Returning to FIG. 9, in block 930, if a current user 101 has moved out of range of the merchant beacon device 120, the method 870 proceeds to block 940.

In block 940, the merchant camera device 140 receives a notification from the account management system 160 that a current user 101 is out of network range of the merchant beacon device 120. In another example, the merchant point of sale device 130 receives a notification from the account management system 160 that the user computing device 110 associated with the current user 101 has stopped sending notifications to the account management system 160 comprising the merchant beacon device 120 identifier. For example, the merchant point of sale device 130 receives the user 101 account identifier associated with the current user 101 associated with a user computing device 110 that is either out of network range or has stopped transmitting notifications comprising the merchant beacon device 120 identifier to the account management system 160, accesses the current customer log, and finds an entry corresponding to the current user 101. For example, the current customer log is maintained by the account management system 160 and the merchant point of sale device 130 accesses the current customer log over the network 120 by communicating with the account management system 160. In another example, the account management system 160 does not transmit a notification to the merchant point of sale device 130 that the current user 101 is out of network range. In this example, the account management system 160 accesses the current customer log and deletes the facial template of the current user 101 from the current customer log. In another example, in addition to deleting the facial template of the current user 101 from the current customer log, the merchant point of sale device 130 deletes the audio template and/or the challenge and response associated with the current user 101 from the current customer log.

In block 950, the merchant point of sale device 130 deletes the facial template of the current user 101 from the current customer log. For example, the current customer log comprises a table and the merchant point of sale device 130 deletes or requests the deletion of an entry or row corresponding to data associated with the current user 101 for which the point of sale device 130 received the notification. In another example, the merchant point of sale device 130 deletes, in addition to the facial template of the current user 101, the associated audio template and/or associated challenge and response of the current user 101 from the current customer log. In another example, the account management system 160 accesses the current customer log and deletes the facial template, audio template, and/or challenge and response of the current user 101 from the current customer log.

From block 950, the method 860 proceeds to block 250, in FIG. 2.

Returning to FIG. 2, in block 250, the user 101 initiates a transaction at the merchant point of sale device 130. The method for initiating, by a user 101, a transaction at a merchant point of sale device 130 is described in more detail hereinafter with reference to the method 260 described in FIG. 10. In the examples described herein, the user 101 initiates a "hands free transaction" at the merchant POS device 130. An example hands free transaction does not require any interaction with the user computing device 110 on the part of the user 101. In another example, a hands free transaction requires only minimal interaction with the user computing device 110 by the user 101.

Figure 10:
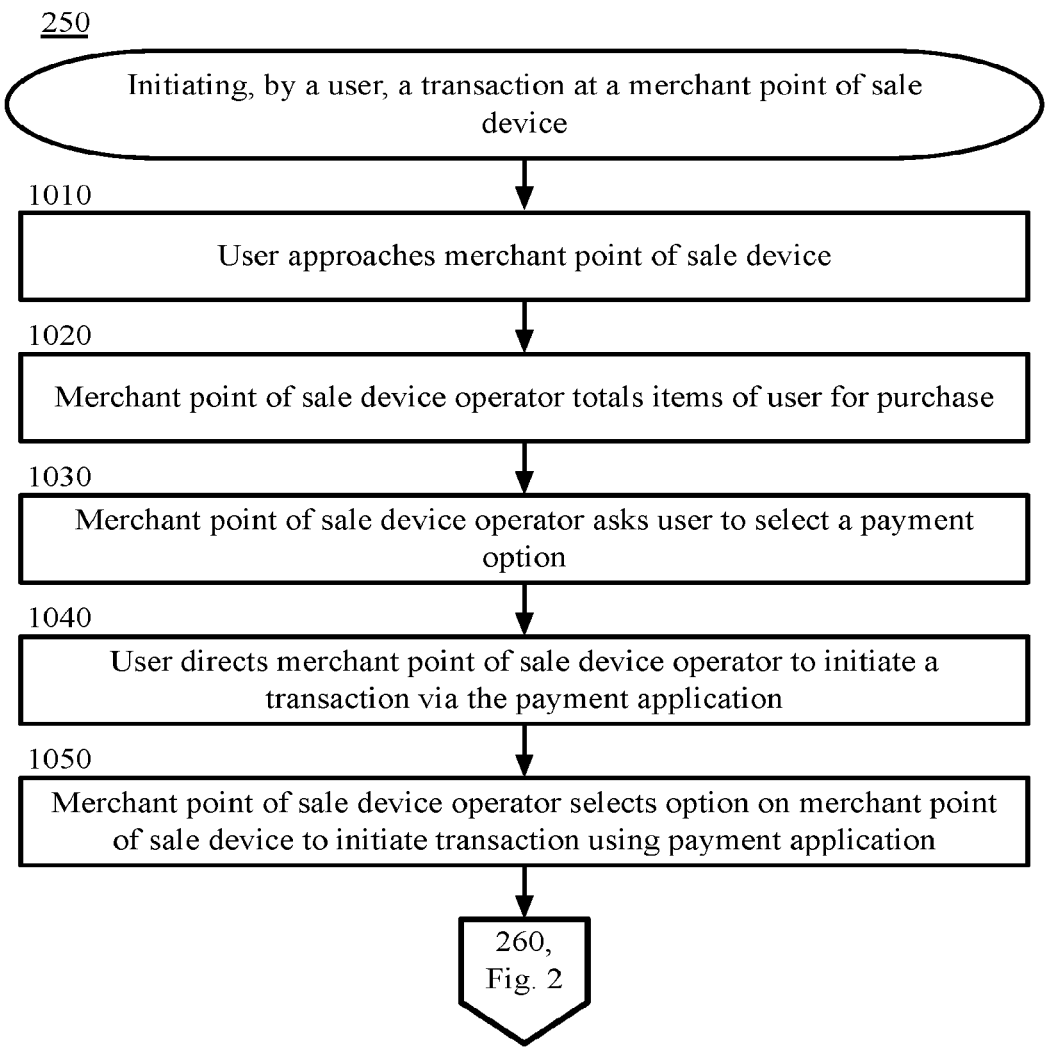
FIG. 10 is a block flow diagram depicting a method for initiating, by a user, a transaction at a merchant point of sale device, in accordance with certain examples.

FIG. 10 is a block diagram depicting a method 250 for initiating, by a user 101, a transaction at a merchant point of sale device 130, in accordance with certain examples. The method 250 is described with reference to the components illustrated in FIG. 1.

In block 1010, the user 101 approaches the merchant point of sale device 130. In an example, at a time prior to approaching the merchant POS device 130, the user 101 browses the merchant system location and selects one or more items to purchase. In this example, the user 101 may collect the one or more items and carry, or otherwise transport via physical basket or shopping cart, the one or more items to the merchant POS device 130.

In block 1020, the merchant point of sale device 130 operator 102 totals the items of the user 101 for purchase. In an example, the merchant POS device operator 102 scans barcodes attached to the one or more items or otherwise enters descriptions and prices associated with the one or more items into the merchant POS device 130. In an example, after scanning or manually entering the items into the merchant POS device 130, the merchant POS device operator 102 actuates an object on the user interface 135 of the merchant POS device 130 to order the merchant POS device 130 to total the items. In an example, the merchant POS device 130 displays, via the user interface 135, the total to the user 101.

In block 1030, the merchant point of sale device 130 operator asks the user 101 to select a payment option. In an example, the merchant POS device 130 displays one or more payment options that the user 101 may select to use in a transaction. Example payment options may comprise payment via a payment application 113 associated with the account management system 160, payment by cash, payment by check, payment by credit card, payment by debit card, and/or any other means of payment that the merchant system can or is willing to accept for payment from the user 101. In an example, the one or more payment options are displayed as objects on the user interface 135 and are selectable by the merchant POS device operator 102 in response to the user 101 directing the merchant POS device 102 operator to make a selection.

In block 1040, the user 101 directs the merchant point of sale device operator 102 to initiate a transaction via the payment application 113. In an example, in response to receiving a verbal request from the user 101 to select the payment application 113 as a payment option, the merchant POS device operator 102 actuates an object on the user interface 135 of the merchant POS device 130 corresponding to the payment application 113 payment option.

In block 1050, the merchant point of sale device operator 102 selects an option on the merchant point of sale device 130 to initiate a transaction using the payment application 113. In an example, the merchant POS device 130 displays a confirmation screen after the merchant POS device operator 102 selects an option to initiate a transaction using the payment application 113. An example confirmation screen may display information summarizing the potential transaction and comprising one or more of a transaction total, a description of the one or more items being purchased by the user 101, and a indication that the user 101 selected the payment application 113 as the method of payment for the transaction. An example confirmation screen may further display options to confirm the transaction or cancel the transaction. In an example, the user 101 reviews the confirmation screen, determines that the information displayed on the confirmation screen is correct, determines to continue with the transaction, and directs the merchant POS device operator 102 to select the option to confirm the transaction via the user interface 135.

From block 1050, the method 250 proceeds to block 260 in FIG. 2.

Returning to FIG. 2, in block 260, the merchant point of sale device 130 identifies the user 101 via facial recognition. The method for identifying, by a merchant point of sale device 130, a user 101 via facial recognition is described in more detail hereinafter with reference to the method 260 described in FIG. 11. In other examples, the merchant point of sale device 130 identifies the user 101 via audio recognition and/or via a challenge and response.

Figure 11:
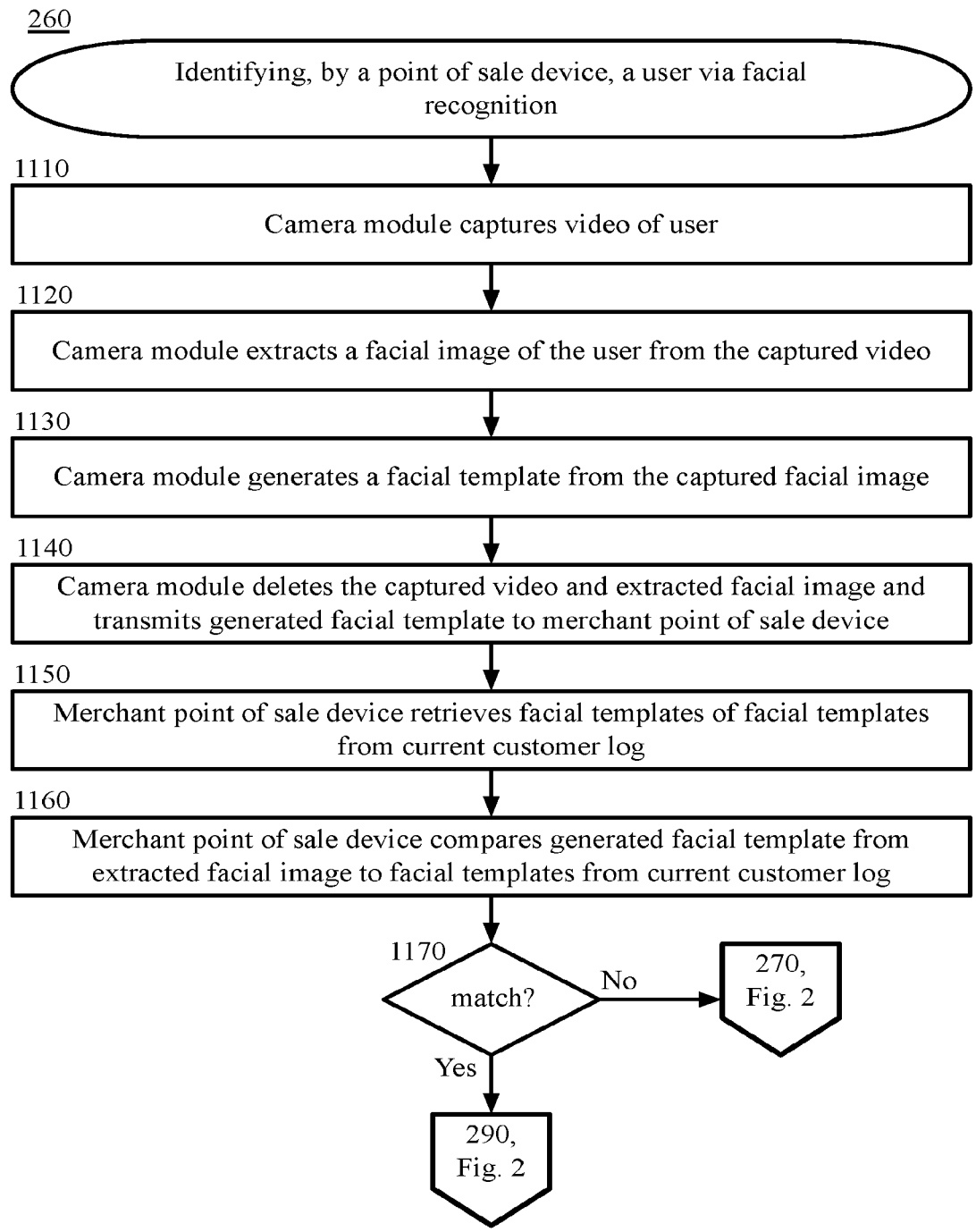
FIG. 11 is a block flow diagram depicting a method for identifying, by a merchant point of sale device, a user via facial recognition, in accordance with certain examples.

FIG. 11 is a block diagram depicting a method 260 for identifying, by a merchant point of sale device 130, a user 101 via facial recognition, in accordance with certain examples. The method 260 is described with reference to the components illustrated in FIG. 1.

In block 1110, a camera module 132 of the merchant point of sale device 130 captures video of the user 101. In an example, in response to receiving a request to identify the user 101, the merchant point of sale device 130 activates the camera module 132 to begin to capture a video of the surroundings of the merchant point of sale device 130. In an example, the merchant POS device 130 captures a video feed of the user's 101 face. In another example, the camera module 132 continuously captures, but does not record, a video feed of its surroundings. In this example, when the merchant point of sale device 130 receives an input from the merchant POS device 130 operator 102, a request to identify the user 101 from the account management system 160, the camera module 132 beings to record the video feed for a threshold amount of time. In an example, the user 101 may be moving during the period in which the camera module 132 records the video feed. In an example, the camera module 132 extracts a facial image by determining a particular frame of the video feed and area of the instance of the video feed corresponding to the face of the user.

In block 1120, the camera module 132 extracts a facial image of the user 101 from the captured video. In an example, the camera module 132 determines a frame of the captured video to provide an image of the user's 101 face and extracts the frame of the captured video comprising the facial image of the user 101.

In certain other examples, the camera module 132 determines a frame of the captured video to provide an image of the faces of a plurality of users 101. For example, the frame comprises an image of the face of a first user 101, a second user 101, and a third user 101 at different locations in the image. In this example, one camera module 132 associated with a particular merchant point of sale device 130 may capture video of an environment corresponding to an area in the proximity of multiple merchant POS devices 130. In this example, the camera module 132 may determine to which particular merchant POS device 130 each of the plurality of faces of the corresponding plurality of users 101 in the extracted image.

In block 1130, the camera module 132 generates a facial template from the captured facial image. In another example, the merchant point of sale device 130 generates the facial template. In an example, the facial template is of a predetermined size, for example, a 128-byte facial template. In an example, the account management system 160 generates a facial template comprising a computer code representation of the digital facial image. For example, the facial template may describe key features of the facial image of the user 101, such as shape, color, line, value, space, form, texture, or other useful or relevant feature of the image or of particular regions of the image. In another example, the facial template is generated by processing the facial image through a convolutional neural network. In an example, the camera module 132 stores the generated facial template in a data storage unit 146 associated with the merchant point of sale device 130. For example, the camera module 132 database may comprise a log of facial templates of current customers wherein the merchant point of sale device 130 stores the generated facial template.

In certain other examples, the camera module 132 continuously captures a video feed of its surroundings as users 101 enter and leave the vicinity of one or more merchant POS devices 130 over the course of a certain time period. In this example, the merchant point of sale device 130 and/or camera module 132 is able to continuously monitor the incoming video feed to detect faces from extracted frames of the video feed. In this example, the camera module 132, each time the camera module 132 detects the presence of one or more faces in the video feed, the camera module 132 extracts a frame of the video feed comprising one or more facial images of one or more corresponding detected faces and creates facial templates based on the extracted one or more facial images. In this example, the merchant point of sale device 130 stores facial templates in the log of facial templates of current customers as they are generated. In this example, as the camera module 132 or the merchant point of sale device 130 generates a subsequent facial templates, the merchant point of sale device 130 determines whether the generated subsequent facial template is similar to within a threshold compared to any of the facial templates already stored in the log of facial templates of current customers. If the generated subsequent facial template is similar to within a threshold to any of the facial templates already stored in the log, the merchant point of sale device, after associating the facial template to one or two particular merchant POS devices 130 based on the position of the associated facial images in the extracted frame of the captured video, adds the facial template to the log of facial templates of current customers. If the generated subsequent facial template is not similar to within a threshold to any facial templates already stored in the log of facial templates of current customers, the merchant point of sale device 130 deletes or otherwise ignores and/or does nothing with the generated facial template. In this example, if the merchant point of sale device 130 determines that certain facial image is no longer in the field of the video feed, the corresponding facial template is deleted from the log of facial templates of current customers.

In block 1140, the camera module 132 deletes the captured video and the extracted facial image. For example, the camera module 132 does not store captured images or video. In this example, facial templates generated by the camera module 132 comprise computer code representations of facial images of users 101. In this example, after generating a facial template or after a threshold time has passed after capturing video or images or extracting an image from a video, the merchant camera device 140 deletes any captured or extracted video or images.

In block 1150, the merchant point of sale device 130 retrieves facial templates from the current customer log. For example, the current customer log comprises facial templates received from the account management system 160 corresponding to all current users 101 whose associated user computing devices 110 are located within a network distance of a merchant beacon device 120.

In block 1160, the merchant point of sale device 130 compares the generated facial template from captured facial image to facial templates from the current customer log.

In block 1170, the merchant point of sale device 130 determines whether there is a match between the generated facial template and one of the facial templates from the current customer log.

If a facial template from the current customer log matches the generated facial template, the method 260 proceeds to block 290 in FIG. 2. For example, the merchant point of sale device 130 processes a transaction.

Returning to block 1170, if none of the facial templates from the current customer log matches the generated facial template, the method 260 proceeds to block 270 in FIG. 2. In another example, if none of the facial templates from the current customer log matches any of the facial templates from the log of facial templates of current customers, the method 260 proceeds to block 270 in FIG. 2.

Returning to block 270, in FIG. 2, the point of sale device 130 identifies the user 101 via voice recognition. In another example, the account management system 160 does not identify the user 101 via voice recognition and proceeds to identify the user 101 via challenge and response. For example, the merchant camera device 140 and/or account management system 160 is unable to identify the user via facial recognition and/or if the merchant camera device 140 and/or account management system 160 identify two or more users 101 via facial recognition. The method for identifying, by an account management system 160, a user 101 via voice recognition is described in more detail hereinafter with reference to the method 270 described in FIG. 12.

Figure 12:
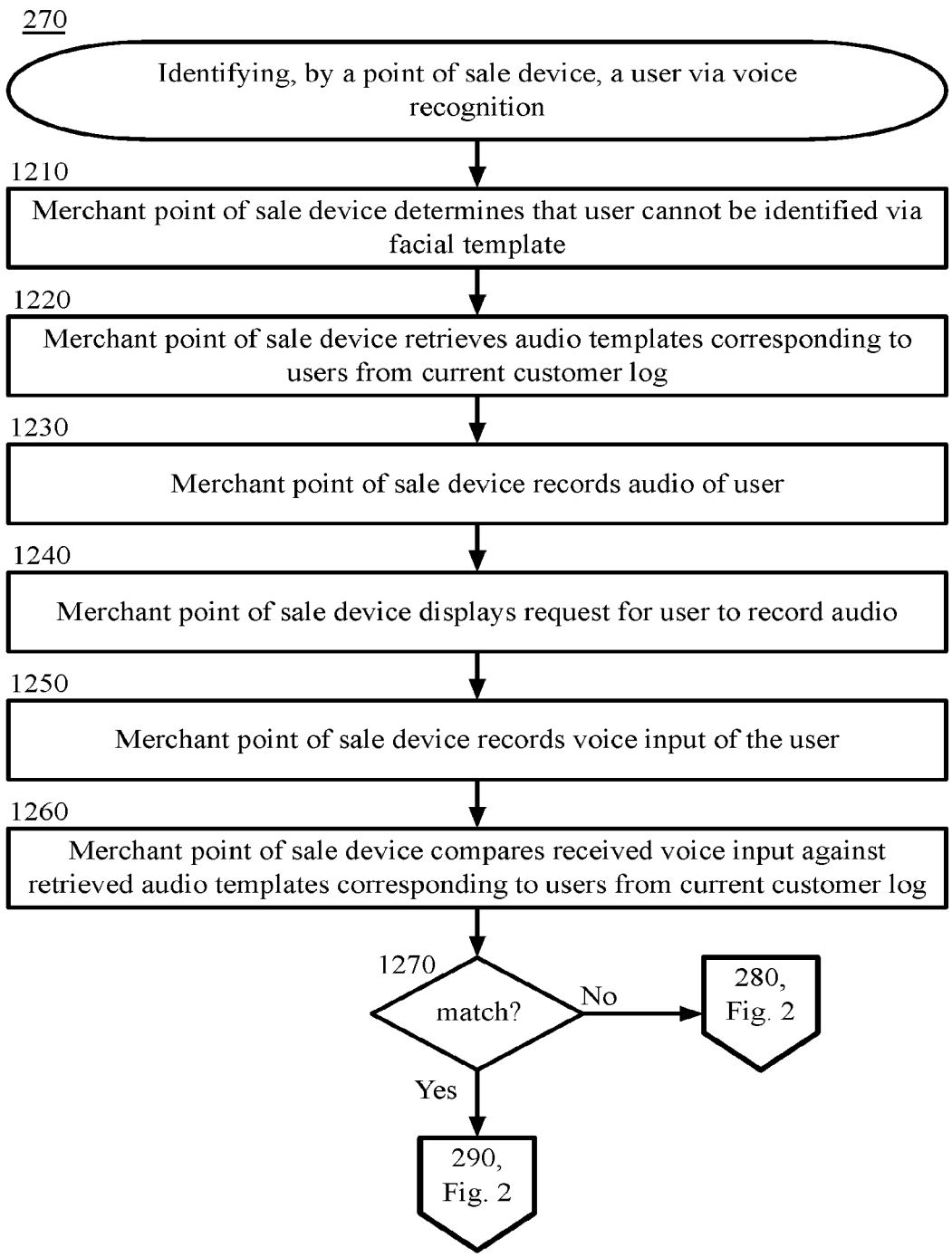
FIG. 12 is a block flow diagram depicting a method for identifying, by a merchant point of sale device, a user via voice recognition, in accordance with certain examples.

FIG. 12 is a block diagram depicting a method 270 for identifying, by an account management system 160, a user 101 via voice recognition, in accordance with certain examples. The method 270 is described with reference to the components illustrated in FIG. 1.

In certain examples, it may be necessary to identify a user 101 via voice recognition because the merchant point of sale device 130 is not able to identify the user 101 based on facial recognition. For example, the merchant camera module 132 may be unable to extract an adequate facial image of the user 101 from the video feed to generate a facial template. In another example, the merchant point of sale device 130 is unable to find a match for the facial template of the user 101 in the current customer log. In yet another example, the merchant point of sale device 130 identifies a matching user 101 facial template in the current customer log, however, the identified user 101 facial template is assigned to two adjacent merchant POS devices 130. In this example, the user 101 may have to identify himself via voice recognition at the POS device 130 at which the user 101 initiates the transaction.

In block 1210, the merchant point of sale device 130 transmits a notice that the user 101 cannot be identified to the account management system 160.

In block 1220, the merchant point of sale device 130 retrieves audio templates corresponding to users 101 from the current customer log. As previously discussed, when a user 101 establishes an account with the merchant point of sale device 130, the user 101 may submit an audio recording of the user's 101 voice to the merchant point of sale device 130. In this example the merchant point of sale device 130 establishes an audio template corresponding to the user 101 based on the received audio recording. In another examples, the user 101 does not submit an audio recording to the merchant point of sale device 130 at the time the user 101 establishes the user 101 account. In this other example, the merchant point of sale device 130 does not have an audio template associated with the user 101 account and cannot verify the user 101 via voice recognition.

In block 1230, the merchant point of sale device 130 transmits a request to the merchant system point of sale device 130 to record audio of the user 101. For example, the merchant point of sale device 130 transmits the request over the network 120.

In block 1240, the merchant system point of sale device 130 displays the request for the user 101 to record audio. For example, the merchant system POS device 130 may display directions to the user 101 to record an audio recording. For example, the user 101 may be directed to speak the same words in the same intonation as the user 101 did when establishing the audio template with the account management system 160 at the time of setting up the user 101 account.

In block 1250, the merchant system point of sale device 130 records a voice input of the user 101. For example, the merchant POS device operator 102 may actuate an object on the user interface 135 to activate an audio module 131 to receive an audio input of the user 101.

In block 1260, the merchant point of sale device 130 compares the received voice input against the retrieved audio templates corresponding to users 101 from the current customer log. For example, the merchant point of sale device 130 receives the audio input of the user 101.

In block 1270, the merchant point of sale device 130 determines whether there is a match between the received voice input and one of the retrieved audio templates from the current customer log. In an example, the merchant point of sale device 130 compares one or more features between the received voice input and each of the retrieved audio templates from the current customer log. In an example, if the similarity between the received voice input and a particular audio template exceeds a predefined threshold, the merchant point of sale device 130 determines that the received voice input matches the particular audio template. In another example, if the similarity between the received voice input and the particular audio template is less than the predefined threshold, the merchant point of sale device 130 determines that the received voice input does not match the particular audio template.

If an audio template from the current customer log matches the received voice input, the method 270 proceeds to block 280 in FIG. 2. For example, the similarity between a particular audio template from the current customer log and the received audio recording of the user 101 exceeds a predefined threshold and the merchant point of sale device 130 determines that there is a match.

Returning to block 1270, if none of the audio templates from the current customer log matches the received voice input, the method 270 proceeds to block 280 in FIG. 2. In another example, the merchant POS device 130 is unable to receive an audio recording of the user 101 or the received audio recording of the user 101 is inadequate and cannot be used to identify the user 101.

Returning to FIG. 2, in block 280, the user 101 is identified by the merchant system POS operator 102 via a challenge and a response. The method for identifying, by a merchant point of sale device operator 102, a user 101 via a challenge and a response is described in more detail hereinafter with reference to the method 280 described in FIG. 13.

Figure 13:
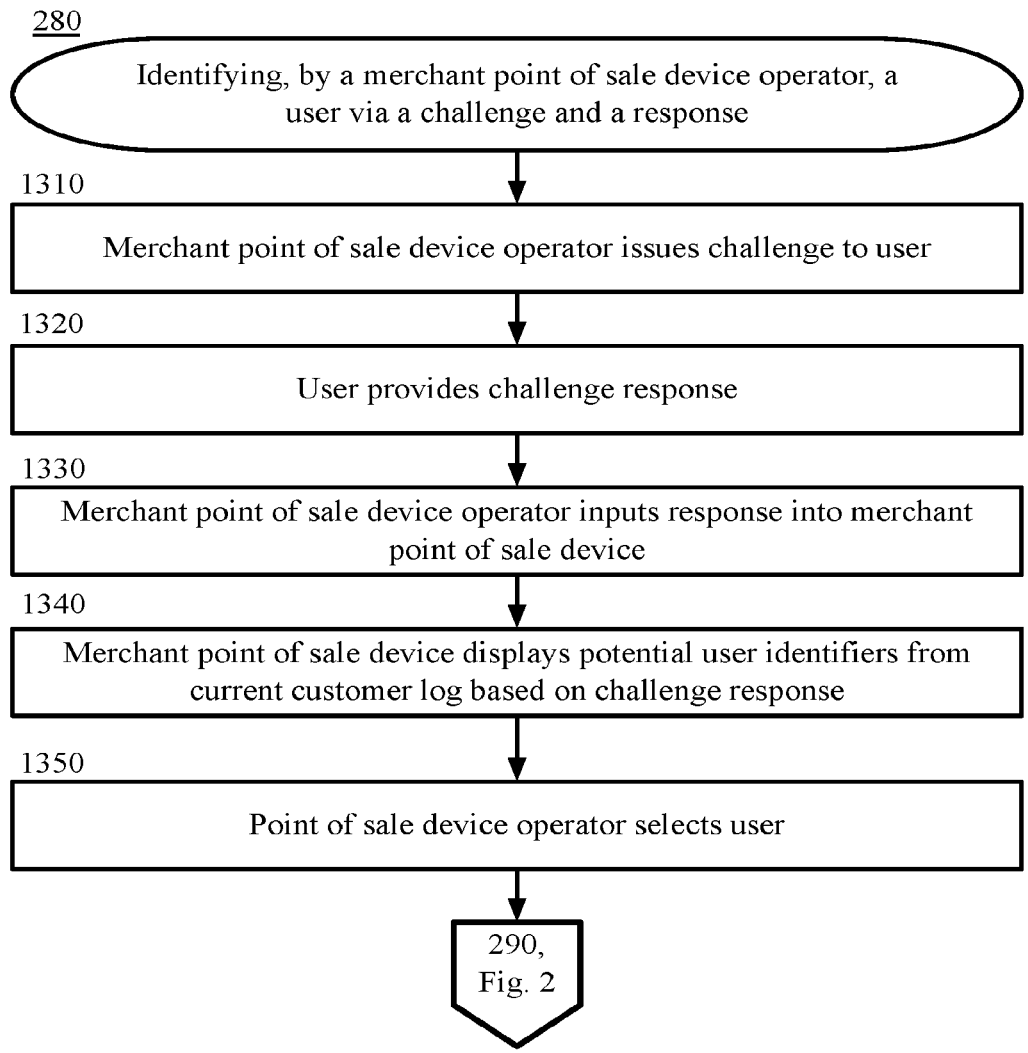
FIG. 13 is a block flow diagram depicting a method for identifying, by a merchant point of sale device operator, a user via a challenge and a response, in accordance with certain examples.

FIG. 13 is a block diagram depicting a method 280 for identifying, by a merchant point of sale device operator 102, a user 101 via a challenge and a response, in accordance with certain examples. The method 280 is described with reference to the components illustrated in FIG. 1.

In block 1310, the point of sale device operator 102 issues a challenge to the user 101. In an example, the merchant POS device operator 102 asks the user 101 for the initials of the user 101. In another example, the merchant POS device operator 102 asks the user 101 for the last four digits of the phone number of the user 101. In another example, the merchant POS device operator 102 asks the user 101 for a configured password. Any suitable challenge may be issued by the merchant POS device operator 102. In an example, the response to the challenge does not provide any secure or private information.

In block 1320, the user 101 provides a challenge response. As described in the example challenges, the responses may be the initials of the user 101, the last four digits of the phone number of the user 101, or a configured password. Any configured challenge response may be utilized. In certain embodiments, the response may be a spoken response, a hand gesture, a keypad entry, a display of an identification card, or any suitable response.

In block 1330, the point of sale device operator 102 inputs the response into the merchant point of sale device 130. The merchant POS device operator 102 inputs the challenge response of the user 101. In an example, if the user 101 indicates that the initials of the user 101 are "AC," then the merchant POS device operator 102 inputs "AC" into the payment application 133 of the merchant POS device 130. In an example, the user interface 135 of the merchant POS device 130 displays a request for an entry of the response of the user 101. The merchant POS device operator 102 enters the response via a virtual or physical keyboard, voice dictation, or in any suitable manner. In an alternate example, the user 101 enters the response into the user interface 135 of the merchant POS device 130.

In block 1340, the merchant point of sale device 130 displays potential users 101 based on the challenge response. The merchant POS device 130 displays potential users 101 based on the challenge response. A list of users 101 that are associated with the challenge response are displayed on the merchant POS device 130 to the merchant POS device operator 102. For example, if ten customers are in the vicinity of the merchant beacon device 120, then the merchant POS device 130 may have received from the account management system 160 a challenge response associated with each of the respective ten customers. When the merchant POS device 130 receives the challenge response input, only the potential users 101 that are associated with the challenge response are displayed to the merchant POS device operator 102.

In another embodiment, the merchant POS device 130 or the account management system 160 which processes the challenge, presents additional challenges until there is a single matching user 101 remaining.

In the example, if the merchant POS device operator 102 inputs "AC" as the initials of the user 101 associated with the transaction, then only the potential users 101 with those initials will be displayed to the merchant POS device operator 102 by the payment application 133. The payment application 133 accesses a database on the account management system 160 or another computing device and identifies the initials of the potential users 101 that have provided tokens. The payment application 133 identifies the one or more potential users 101 that have the initials "AC" and displays the identified user 101 accounts to the merchant POS device operator 102. In the example, two of the ten customers that are in the vicinity of the merchant beacon device 120 have the initials "AC." The user 101 accounts of the two customers are displayed to the merchant POS device operator 102.

In certain examples, all of the nearby customers who have had tokens transmitted to the merchant POS device 130 are presented to the merchant POS device operator 102 and the merchant POS device operator 102 selects the appropriate user 101 account.

The payment application 133 may display a picture of the potential user 101 accounts that are presented to the merchant POS device operator 102. For example, each user 101 may associate a picture with a user 101 account. When the merchant POS device 130 presents the one or more potential user 101 accounts to the merchant POS device operator 102, the merchant POS device operator 102 may select the appropriate user 101 account based on the picture matching the user 101 conducting the transaction. Other identifying information may be presented instead of, or in addition to, a picture. For example, the name of the user 101 may be displayed and the merchant POS device operator 102 may identify the potential user 101 with that name. Any other suitable identifying information may be presented.

In block 1350, the merchant point of sale device operator 102 selects the user 101 account for use in a transaction. After identifying the displayed picture of the user 101, the merchant POS device operator 102 may input a selection of the user 101 by actuating a user interface 135 control associated with the picture, or by inputting the selection in any suitable manner. If the picture doesn't match any of the potential users, then the merchant POS device operator 102 may cancel the transaction, notify the user 101 of the discrepancy, or perform any other suitable action.

In an example, only a single user 101 account is presented in the list of potential users 101. If only a single user 101 account is identified, then the method may proceed after the merchant POS device operator 102 verifies that the displayed picture matches the user 101. If the picture doesn't match, then the merchant POS device operator 102 may cancel the transaction, notify the user 101 of the discrepancy, or perform any other suitable action.

From block 1350, the method 280 proceeds to block 290 in FIG. 2.

Returning to FIG. 2, in block 290, a transaction is processed. The method for processing a transaction is described in more detail hereinafter with reference to the method 290 described in FIG. 14.

Figure 14:
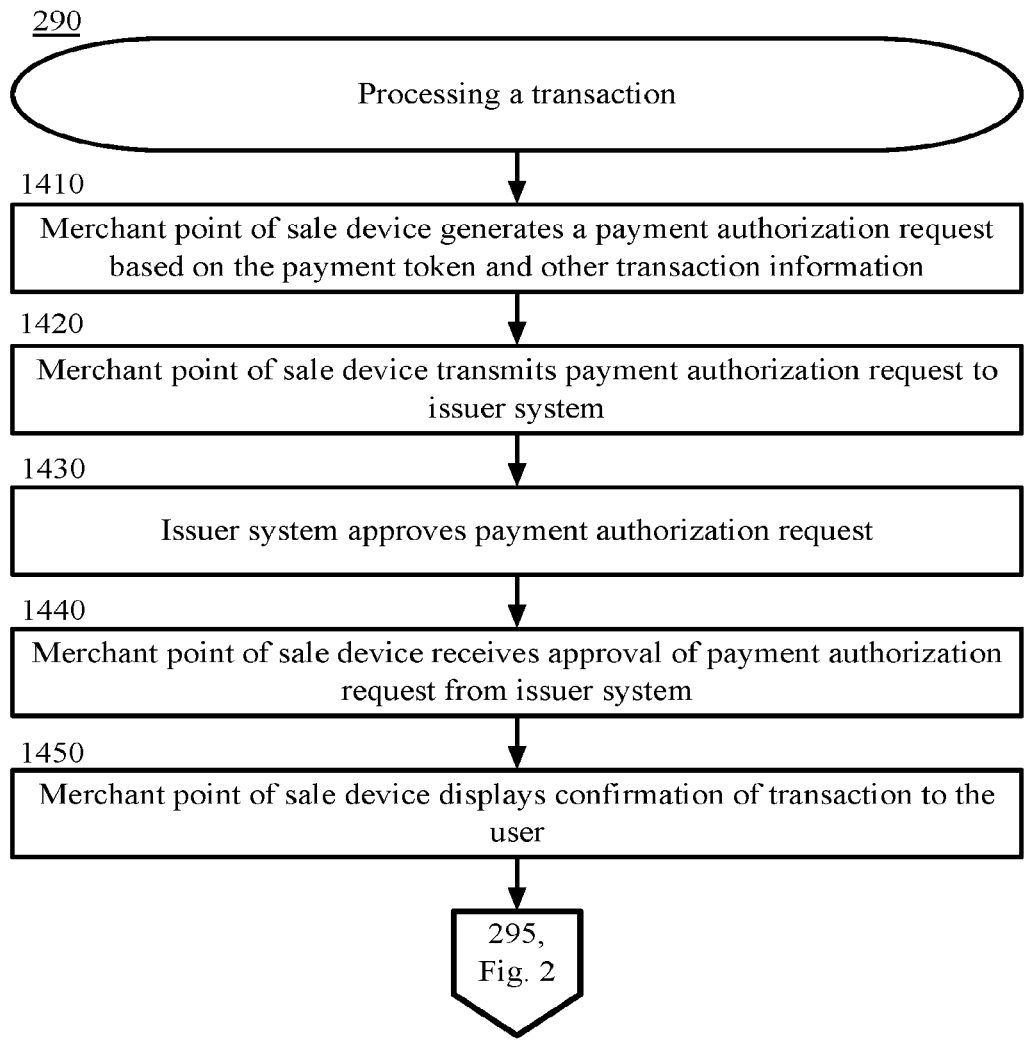
FIG. 14 is a block flow diagram depicting a method for conducting a transaction, in accordance with certain examples.

FIG. 14 is a block diagram depicting a method 290 for processing a transaction, in accordance with certain examples. The method 290 is described with reference to the components illustrated in FIG. 1.

In block 1410, the merchant point of sale device 130 generates a payment authorization request based on the payment token and other transaction information. In an example, the payment authorization request comprises the payment token received from the account management system 160 for the user 101 along with transaction details including a transaction total, a description of one or more items being purchased, a merchant identifier, a merchant payment account identifier, and/or other relevant transaction details.

In block 1420, the merchant point of sale device 130 transmits the payment authorization request to the issuer system 150. For example, the merchant point of sale device 130 communicates the payment authorization request to the issuer system 150 via the network 120.

In block 1430, the issuer system 150 approves the payment authorization request. In an example, the issuer system 150 identifies the user payment account based on the received payment token. For example, the issuer system 150 accesses a database that associates payment tokens with user 101 payment account identifiers. In an example, the database may further associate payment tokens with one or more conditions, such as a length of time for which the payment token is valid. For example, a payment token may only be valid for a threshold length of time, for example one hour, after it is generated by the account management system 130. In this example, as part of the transaction details in the payment authorization request, a current timestamp is received from the merchant point of sale device 130 and the issuer system 150 compares the received timestamp from the transaction details to the one or more time conditions described in the database associated with the payment token and/or one or more data received from the account management system 160 at the time of the receipt of the payment token. In another example, the payment token is valid only for use at a particular merchant system. In this example, the transaction details received with the payment authorization request from the merchant point of sale device 130 identifier comprise a merchant system identifier. In this example, the issuer system 150 determines that the payment token is valid if the merchant identifier received in the transaction details of the payment authorization request match the merchant identifier in the one or more conditions associated with the payment token in the database. In certain other examples, other conditions related to time, location, merchant identifier, or a combination of these conditions and/or other conditions may be specified in the database as associated with one or more particular payment tokens. In an example, the issuer system 150 verifies that a payment token received as part of a payment authorization request is valid based at least in part on data received from the merchant point of sale device 130 and/or data currently available to the issuer system 150. In an example, to process the transaction, the issuer system 150 identifies the user payment account associated with the received payment token in the database processes the transaction using the transaction details and the user payment account information.

In block 1440, the merchant point of sale device 130 receives an approval of the payment authorization request from the issuer system 150. In an example, the issuer system 150 either approves or declines the payment authorization request. In this example, the issuer system 150 may base the decision of whether to approve or decline the payment authorization request based on a total amount of transaction the current available credit of the user 101 for the user 101 payment account. In an example, the merchant point of sale device 130 receives, via the network 120, the approval of the payment authorization request from the issuer system 150 if the issuer system 150 approves the payment authorization request. In another example, the merchant point of sale device 130 receives a notice of declined payment authorization request from the issuer system 150 via the network 120 if the issuer system 150 declines the payment authorization request.

In block 1450, the merchant point of sale device 130 displays a confirmation of the approved transaction to the user 101. An example confirmation of the approved transaction may include a total amount charged to the user 101 payment account, an identification of the user 101 payment account, a merchant system name, and/or other relevant or useful information. In another example, the merchant point of sale device 130 displays a notification of a declined transaction in response to receiving a notice of declined payment authorization request from the issuer system 150.

For example, the merchant point of sale device 130 displays a message reading "This transaction has been declined" to the user via the user interface 135 of the merchant point of sale device 130. In another example, the merchant point of sale device 130 prints a receipt for the user 101.

In certain examples, from block 1450, the method 290 proceeds to block 295 in FIG. 2. In certain other examples, the method 290 may end at block 1450.

Returning to FIG. 2, in block 295, a user 101 updates a facial template, an audio template, or a challenge and response associated with an account of the user 101. For example, the user 101 associated with the user 101 account, at a time after initially configuring a facial template, audio template, and/or challenge and response for the user account, may wish to update one or more of the facial template, the audio template, and/or the challenge and response associated with the user account. In this example, the user 101 may update the facial template, audio template and/or challenge and response at a time before an initial hands-free transaction or at a time after the initial transaction. In another example, the user computing device 110 is stolen from the user 101 and an illegitimate user attempts to reconfigure the facial template, audio template, and/or challenge and response for the user account so that the illegitimate user can engage in hands-free transactions using the user computing device of the user.

The method for updating, by a user 101, a facial template, an audio template, or a challenge and response associated with an account of the user 101 is described in more detail hereinafter with reference to the method 295 described in FIG. 15.

Figure 15:
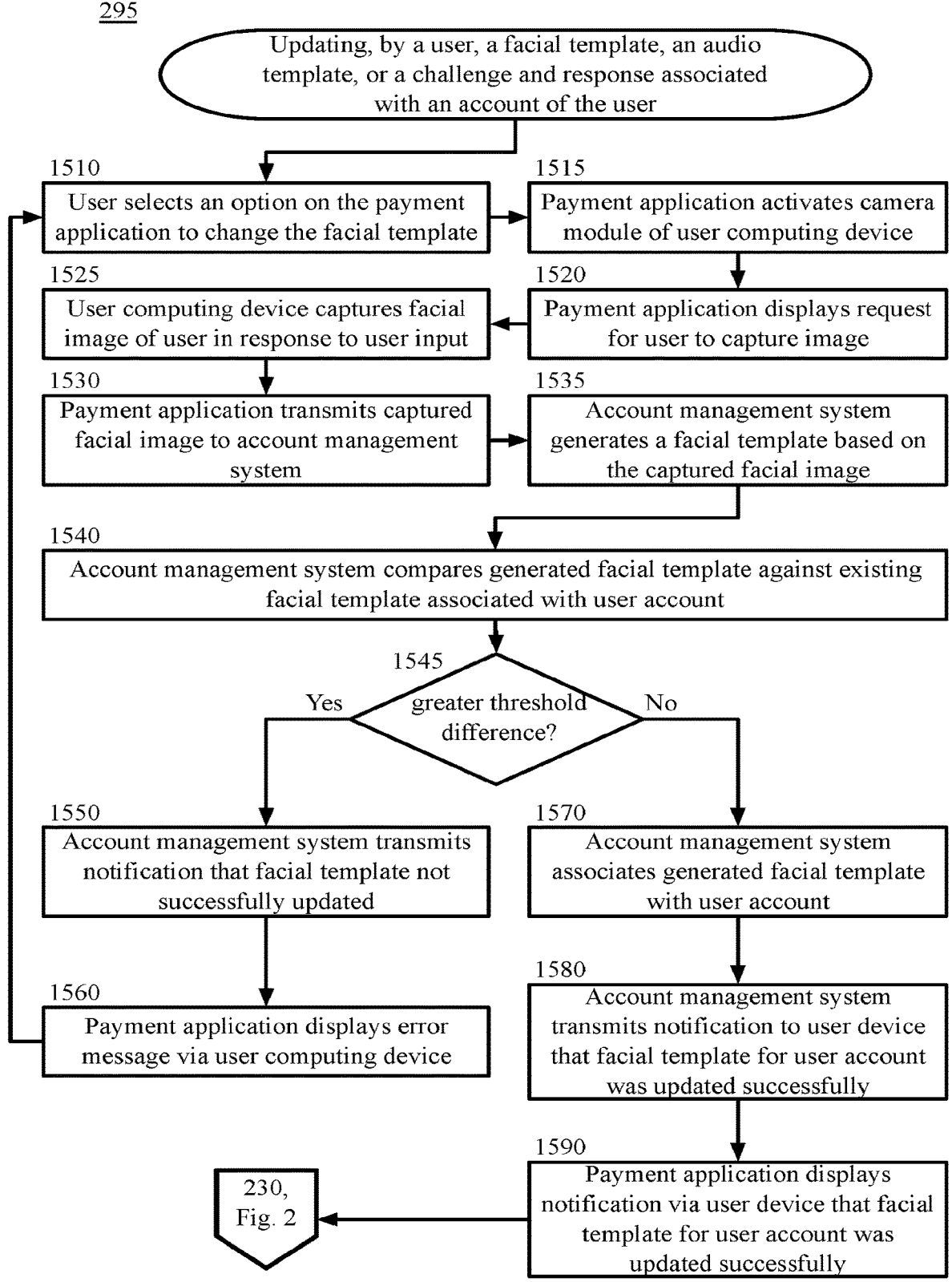
FIG. 15 is a block flow diagram depicting a method for updating, by a user, a facial template, audio template, or challenge and response associated with an account of the user, in accordance with certain examples.

FIG. 15 is a block diagram depicting a method 295 for updating, by a user 101, a facial template, an audio template, or a challenge and response associated with an account of the user 101, in accordance with certain examples. The method 295 is described with reference to the components illustrated in FIG. 1.

In block 1510, the user 101 selects an option on the payment application 113 to change the facial template associated with the user 101 account. In another example, the user 101 selects an option on the payment application 113 to change the audio template associated with the user 101 account.

In block 1515, the payment application 113 activates the camera module 132 of the user computing device 110. In another example, the payment application 113 activates an audio module (not depicted) of the user computing device 110.

In an example, the user computing device user interface 115 may display a live camera feed of the user 101 to aid the user 101 in aligning the user's 101 face to take the facial image. In an example, the payment application 113 may display on the user computing device 110 a box or other perimeter on the user interface 115 within which the user 101 should align his face to take a picture of a required size predetermined by the account management system 160.

In another example, the payment application 113 activates an audio module (not depicted) on the user computing device 110 and the user 101 captures an audio of the user's 101 voice. In an example, the user computing device user interface 115 may display guidelines received from the account management system 160 to aid the user 101 in submitting an audio recording. For example, the payment application 113 may display directions for the user 101 to record the user's 101 voice saying the user's 101 name. In another example, the payment application 113 directs the user 101 to capture an audio recording to establish a voice password that can be used in hands-free transactions of the user 101.

In block 1520, the payment application displays a request for the user 101 to capture an image. In another example, the payment application displays a request for the user to capture an audio recording.

In block 1525, the user computing device 110 captures a facial image of the user 101 in response to a user 101 input to the user computing device 110. In another example, the user computing device 110 captures an audio recording of the user 101 in response to a user 101 input to the user computing device 110. In an example, the user 101 may actuate an object on the user interface 115 to capture the image. In this example, in response to the user actuating the object on the user interface 115, the camera module 117 receives a command from the payment application 113 to capture an image of the user 101. In another example, the camera module 117 receives a command from the payment application 113 to capture a plurality of images of the user 101 as the user 101 moves the camera around the user's 101 face. For example, each of the plurality of images of the user 101 may correspond to a particular pose of the user's 101 face. An example facial image may comprise a digital image of the face of a user 101. In an example, the account management system 160 may establish guidelines for users 101 in submitting facial images. For example, the payment application 113 may direct the user 101 to remove any hats, head coverings, glasses, or other objects or accessories that may occlude regions of the user's 101 face so that payment application 160 may receive a complete depiction of the user's 101 face.

In an example, the user 101 may actuate an object on the user interface 115 to capture or record a live audio recording. In this example, in response to the user actuating the object on the user interface 115, the audio module receives a command from the payment application 113 to capture an audio recording of the user 101. In an example, the account management system 160 may establish guidelines for users 101 in submitting audio recordings. For example, the payment application 113 may direct the user 101 to submit an audio recording no longer than a predefined maximum length of duration. For example, the audio recording must be no longer than five seconds. In another example, the payment application 113 may direct the user 101 submit an audio recording lasting a predefined length of time, for example, an audio recording lasting five seconds. In an example, after the user 101 initiates an audio recording by actuating an object of the user interface 115, the payment application 113 transmits a command to the audio module to stop recording the user's 101 voice after the predefined length of time or predefined maximum length of time has expired.

In certain examples, the user computing device 110 determines if the captured facial image is a valid facial image or an invalid facial image. For example, a valid facial image complies with guidelines predetermined by the account management system 160 and an invalid facial image does not comply with one or more of the guidelines. For example, if the user computing device 110 captures a facial image that comprises incorrect dimensions, if part or all of the user's 101 face is occluded, or if the image is too dark or too bright, the user computing device 110 rejects the invalid facial image and displays a request directing the user 101 to capture a subsequent facial image. In another example, the user 101 submits a facial image that is not of a face and the payment application 113 determines, via facial recognition, that the image is not of a face and transmits a request to the user computing device 110 directing the user 101 capture a subsequent facial image to transmit to the account management system 160. In this example, the user computing device 110 receives and displays the request, the user 101 captures a subsequent facial image via the user computing device 110.

In block 1530, the payment application 113 transmits the captured facial image to the account management system 160. For example, the payment application 113 transmits the captured facial image to the account management system 160 via the network 120. In another example, the payment application 113 transmits the captured audio recording to the account management system 160 via the network 120. In an example, the account management system 160 receives the facial image or audio recording captured by the user computing device 110 via the network 120.

In block 1535, the account management system 160 generates a facial template based on the captured facial image. In another example, the account management system 160 generates an audio template based on the captured audio recording. In an example, the account management system 160 creates a facial template associated with the user 101 account based on the received facial image. In another example, the account management system 160 generates a corresponding facial template for each of a plurality of received facial images associated with the user 101 account. In an example, the facial template is of a predetermined size, for example, a 128-byte facial template. In an example, the account management system 160 generates a facial template comprising a computer code representation of the digital facial image. For example, the facial template may describe key features of the facial image of the user 101, such as shape, color, line, value, space, form, texture, or other useful or relevant feature of the image or of particular regions of the image. In an example, the facial template is generated by processing the facial image through a convolutional neural network.

In an example, after the user computing device 110 captures one or more facial images of the user 101, the user computing device 110 generates one or more facial templates corresponding to one or more of the one or more captured facial images of the user 101. In this example, the user computing device 110 transmits the one or more generated facial templates to the account management system 160 over the network 120. In an example, the account management system 160 deletes the received facial image. For example, the account management system 160 only uses a facial template comprising a computer code representation of the facial image of the user 101. For example, the facial template is of a predetermined size, for example, a 128-byte facial template. In an example, the account management system 160 generates a facial template comprising a computer code representation of the digital facial image. For example, the facial template may describe key features of the facial image of the user 101, such as shape, color, line, value, space, form, texture, or other useful or relevant feature of the image or of particular regions of the image. In an example, the facial template is generated by processing the facial image through a convolutional neural network.

In another example, the account management system 160 creates an audio template associated with the user's 101 voice based on the received audio of the voice of the user. In an example, the audio template is of a predetermined size. In an example, the account management system 160 generates an audio template comprising a computer code representation of the user's 101 audio recording. For example, the audio template may describe key features of the audio recording of the user 101, such as the intonation of the user's 101 voice or other features of the user's 101 voice. In an example, account management system 160 deletes the received audio of the voice of the user 101. In an example, the account management system 160 deletes the received audio recording of the user 101 to protect the privacy of the user 101. For example, the account management system 160 only uses an audio template comprising a computer code representation of the audio recording of the user 101. For example, the audio template may describe key features of the audio recording of the user 101, such as the intonation of the user's 101 voice or other features of the user's 101 voice.

In block 1540, the account management system 160 compares the generated facial template against the existing facial template associated with the user 101 account. In an example, the account management system 160 compares like features from the generated facial template against corresponding like features from the existing facial template associated with the user 101 account. For example, the account management system 160 may compare the key features of the generated facial template, such as shape, color, line, value, space, form, texture, or other useful or relevant feature of the image or of particular regions of the image against similar key features of the existing facial template associated with the user 101 account. In an example, for each key feature, the account management system 160 generates an individual delta value that describes a degree or proportion of difference between the generated facial template and the existing facial template. In this example, the account management system 160 generates an overall delta value or aggregated delta value based on each individual delta value. For example, the overall delta value or aggregated delta value gives an overall measure of the degree of difference between the generated facial template and the existing facial template. In this example, an individual delta value or overall (or aggregated) delta value may comprise a number between 0 and 1, with 1 meaning that the facial templates are completely alike and 0 meaning that the facial templates are completely unalike.

In another example, the account management system 160 compares the generated audio template against the existing audio template associated with the user 101 account. In an example, the account management system 160 compares like features from the generated audio template against corresponding like features from the existing audio template associated with the user 101 account. For example, the account management system 160 may compare the key features of the generated audio template, such as intonation of the user's voice, or other useful or relevant feature of the sound recording of the generated audio template against similar key features of the existing audio template associated with the user 101 account. In an example, for each key feature, the account management system 160 generates an individual delta value that describes a degree or proportion of difference between the generated audio template and the existing audio template. In this example, the account management system 160 generates an overall delta value or aggregated delta value based on each individual delta value. For example, the overall delta value or aggregated delta value gives an overall measure of the degree of difference between the generated audio template and the existing audio template. In this example, an individual delta value or overall (or aggregated) delta value may comprise a number between 0 and 1, with 1 meaning that the audio templates are completely unalike and 0 meaning that the audio templates are completely alike. In this example, the individual and overall or aggregated delta values represent a degree of difference between the facial or audio templates. In other examples, however, the individual and overall or aggregated delta values represent a degree of likeness between the facial or audio templates.

In block 1545, the account management system 160 determines whether the difference between the generated facial template and the existing facial template associated with the user 101 account is greater than a threshold amount. In another example, the account management system 160 determines whether the difference between the generated audio template and the existing audio template associated with the user 101 account is greater than a threshold amount. In an example, predefining a higher threshold delta amount results in more security fore users 101 because it makes it more different for an illegitimate user 101 to attempt to replace the facial template of the user 101 with a facial template of the illegitimate user 101. However, predefining a higher threshold delta amount for comparing existing facial or audio templates against generated facial or audio templates may result in inconvenience for the user 101 when the user 101 desires to update the facial template of the user 101. For example, a user 101 capturing an image in poor lighting conditions or capturing a sound recording with background noise interference may result in an overall or aggregated delta value that does not exceed the predefined threshold even though individual delta values for other applicable key features may exceed a required threshold for individual feature-specific delta values. In this example, predefining a lower threshold delta amount results in less security for users 101 because it makes it more different for an illegitimate user 101 to attempt to replace the facial template of the user 101 with a facial template of the illegitimate user 101. However, predefining a lower threshold delta amount for comparing existing facial or audio templates against generated facial or audio templates also may result in more convenience for users 101.

If the account management system 160 determines that the difference between the generated facial template or generated audio template and existing facial template associated with the user 101 account or existing audio template associated with the user 101 account is greater than a threshold difference, the method 295 proceeds to block 1550. For example, the predefined overall or aggregated threshold delta value for comparing the difference of a generated facial template against an existing facial template currently associated with a user 101 account is 0.1 and the determined overall or aggregated delta value based on the account management system 160 comparing the generated facial image against the existing facial template associated with the user 101 account is 0.12. In certain other examples, instead of determining a overall delta value that is greater than a predetermined threshold delta value representing a degree of difference between the generated facial or audio template and the existing facial or audio template, the account management system 160 determines an overall delta value that is less than a predetermined threshold delta value representing a degree of likeness between the generated facial or audio template and the existing facial or audio template.

In block 1550, the account management system 160 transmits notification to the user computing device 110 that the facial template associated with the user 101 account was not successfully updated. In another example, the account management system 160 transmits notification to the user computing device 110 that the audio template associated with the user 101 account was not successfully updated. For example, in response to determining an overall delta value that is greater than a predetermined threshold delta value representing a degree of difference or an overall delta value that is less than a predetermined threshold delta value representing a degree of likeness between the generated facial or audio template and the existing facial or audio template, the account management system 160 transmits the notification to the user computing device 110 that the facial template was not successfully updated and deletes the generated facial template.

In block 1560, the payment application 113 displays an error message via the user computing device 110. For example, the payment application 113 displays, via the user interface 115 of the user computing device 110, a message that reads "user account facial template update attempt unsuccessful; please try again later."

From block 1560, the method 295 returns to block 1510, and the user 101 attempts a second or subsequent time to update the facial template and/or audio template associated with the user 101 account. In an example, if the user 101 (or an illegitimate user) unsuccessfully attempt to update the facial template and/or audio template the audio template associated with the user 101 account more than a predetermined number of times, the account management system 160 may otherwise alert the user 101. In other examples, if the user 101 (or an illegitimate user) unsuccessfully attempt to update the facial template and/or audio template the audio template associated with the user 101 account more than a predetermined number of times, the account management system 160 may disable or deactivate the user account so that the user 101 account may not be accessed or used in any transactions until the user 101 contacts the account management system 160.

Returning to block 1545, in FIG. 15, if the account management system 160 determines that the difference between the generated facial template or generated audio template and existing facial template associated with the user 101 account or existing audio template associated with the user 101 account is less than or equal to a threshold difference, the method 295 proceeds to block 1570. For example, the predefined overall or aggregated threshold delta value for comparing the difference of a generated facial template against an existing facial template currently associated with a user 101 account is 0.1 and the determined overall or aggregated delta value based on the account management system 160 comparing the generated facial image against the existing facial template associated with the user 101 account is 0.05. In certain other examples, instead of determining a overall delta value that is less than or equal to than a predetermined threshold delta value representing a degree of difference between the generated facial or audio template and the existing facial or audio template, the account management system 160 determines an overall delta value that is greater than or equal to a predetermined threshold delta value representing a degree of likeness between the generated facial or audio template and the existing facial or audio template.

In block 1570, the account management system 160 associates the generated facial template with the user 101 account. In an example, the account management system 160 stores the generated facial template associated with the user 101 in a data storage unit 166 associated with the account management system 160. For example, the account management system 160 database may comprise a table or other means by which it correlates each user 101 account identifier with an associated facial template of the user 101.

In another example, the account management system 160 associates the generated audio template with the user 101 account. In an example, the account management system 160 disassociates the previous facial template and/or audio template from the user 101 account and may delete the previous facial template and/or audio template. In an example, the account management system 160 stores the generated audio template associated with the user 101 in a data storage unit 166 associated with the account management system 160. For example, the account management system 160 database may comprise a table or other means by which it correlates each user 101 account identifier with an associated audio template of the user 101.

In block 1580, the account management system 160 transmits a notification to the user computing device 110 that the facial template for the user 101 account was updated successfully. In another example, the account management system 160 transmits a notification to the user computing device 110 that the audio template for the user 101 account was updated successfully.

In block 1590, the payment application 113 displays a notification via the user computing device 110 that the facial template for the user 101 account was updated successfully. For example, the payment application 113 displays, via the user interface 115 of the user computing device 110, a message that reads "user account facial template update successful."

In certain examples, from block 1590, the method 295 returns to block 230 in FIG. 2. For example, the user 101 may now engage in transactions according to the methods described herein using the updated facial and/or audio template.

OTHER EXAMPLES

FIG. 16 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different examples, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to update facial image data associated with user accounts comprising:
by an account management computing system:
maintaining a log associated with a location comprising a point of sale device, the log including a respective facial template associated with one or more respective users that have provided location data associated with the location to the account management system;
receiving, from a user computing device,
a facial image of a user of the user computing device and
a request to modify first facial image data associated with a user account of the user according to the received facial image;
in response to the request, generating second facial image data comprising a computer code representation of the received facial image;
comparing the second facial image data and the first facial image data associated with the user account to determine a difference value representing a difference between the generated second facial image data and the first facial image data;
determining that the difference value is less than a predefined difference value;
in response to the determining that the difference value is less than a predefined difference value, associating the second facial image data with the user account;
at a time after associating the second image data with the user account, receiving, from the user computing device, location data indicative of the location comprising the point of sale device;
in response to receiving, from the user computing device, the location data indicative of the location comprising the point of sale device, adding the second facial image data to the log; and
transmitting the log including the second facial image data associated with the user account to the point of sale device;
wherein the transmitted log is used by the point of sale device to authenticate the user to conduct a sales transaction with the user by comparing image data of the user captured by a camera in proximity to the point of sales device to entries in the log.

2. The computer-implemented method of claim 1, wherein the facial image is captured via a camera device of the user computing device.

3. The computer-implemented method of claim 1, further comprising, by the account management computing system, at a time before receiving the facial image of the user:
receiving a first facial image of the user;
generating the first facial image data based on the first facial image; and
associating the first facial image data with the user account.

4. The computer-implemented method of claim 3, wherein the first facial image is received from the user computing device.

5. The computer-implemented method of claim 4, wherein the first facial image is captured via a camera device of the user computing device.

6. The computer-implemented method of claim 1, wherein the first facial image data comprises a first facial image template, and wherein the second facial image data comprises a second facial image template.

7. The computer-implemented method of claim 6, wherein the first facial template and the second facial template comprise respective computer generated code representing one or more features of the first facial image and the received facial image, respectively.

8. The computer-implemented method of claim 7, wherein the one or more features comprise one or more of shape, color, line, value, space, form, and texture of the first facial image and the received facial image.

9. The computer-implemented method of claim 1, wherein determining the difference value comprises:
comparing one or more particular features of the generated second facial image data to one or more corresponding features of the first facial image data;
for each of the compared one or more particular features, determining a particular delta value that describes a degree of difference between the generated second facial image data and the generated first facial image data with respect to the compared particular feature; and
based on the particular determined delta values, calculating the difference value.

10. The computer-implemented method of claim 1, further comprising, by the account management computing system:
at a time before receiving the facial image, receiving, from the user computing device, location data corresponding to a location comprising a point of sale device;
adding the first facial image data to a log of current customers;
receiving, from the point of sale device at the location, a request for the log of current customers; and
transmitting, to the point of sale device at the location, the log of current customers comprising at least the first facial image data.

* * * * *